US012670217B1

(12) United States Patent
Sirohi

(10) Patent No.: US 12,670,217 B1
(45) Date of Patent: Jun. 30, 2026

(54) DATA STRUCTURE TO SUPPORT QUERY REQUESTS

(71) Applicant: Amazon Technologies, Inc., Seattle, WA (US)

(72) Inventor: Vishal Sirohi, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 17/219,467

(22) Filed: Mar. 31, 2021

(51) Int. Cl.
| | |
|---|---|
| *G06F 16/903* | (2019.01) |
| *G06F 16/901* | (2019.01) |
| *G06F 16/93* | (2019.01) |
| *G06Q 10/0631* | (2023.01) |

(52) U.S. Cl.
CPC ...... *G06F 16/90344* (2019.01); *G06F 16/901* (2019.01); *G06F 16/93* (2019.01); *G06Q 10/063112* (2013.01)

(58) Field of Classification Search
CPC .. G06F 16/90344; G06F 16/901; G06F 16/93; G06Q 10/063112
USPC .......................................................... 707/741
See application file for complete search history.

(56) References Cited

U.S. PATENT DOCUMENTS

| | | | | |
|---|---|---|---|---|
| 6,269,369 | B1 * | 7/2001 | Robertson ............ | G06Q 10/025 |
| 9,715,496 | B1 | 7/2017 | Sapoznik et al. | |
| 10,127,511 | B1 | 11/2018 | Epstein et al. | |
| 2004/0215664 | A1 * | 10/2004 | Hennings .............. | G06F 16/957 |
| 2010/0228783 | A1 * | 9/2010 | Castellanos ......... | G06F 11/3672 |
| | | | | 707/E17.05 |
| 2010/0306222 | A1 * | 12/2010 | Freedman ........... | G06F 16/9014 |
| | | | | 707/769 |
| 2013/0086135 | A1 * | 4/2013 | Kaplan ................... | G06F 16/17 |
| | | | | 707/827 |
| 2014/0222807 | A1 * | 8/2014 | Lee ...................... | G06F 16/9535 |
| | | | | 707/769 |
| 2016/0306671 | A1 | 10/2016 | Kadioglu et al. | |
| 2016/0349960 | A1 | 12/2016 | Kumar et al. | |
| 2017/0024680 | A1 | 1/2017 | Allison et al. | |
| 2017/0111505 | A1 | 4/2017 | McGann et al. | |
| 2018/0089058 | A1 | 3/2018 | Anantharam et al. | |
| 2018/0165300 | A1 * | 6/2018 | Okun .................. | G06F 16/2246 |
| 2018/0307705 | A1 * | 10/2018 | Bender .............. | G06F 11/1435 |
| 2020/0110729 | A1 * | 4/2020 | Pappanaickenpalayam | |
| | | | Muthuswamy ....... | G06F 16/275 |
| 2021/0011889 | A1 * | 1/2021 | Sastry ................... | G06F 16/211 |
| 2021/0089524 | A1 * | 3/2021 | Benanav ........... | G06F 16/24526 |
| 2021/0149899 | A1 * | 5/2021 | Gutiérrez ............... | H04L 67/02 |
| 2021/0342084 | A1 * | 11/2021 | Ng .......................... | G06F 3/067 |

OTHER PUBLICATIONS

USPTO Non-Final Office Action dated Sep. 1, 2023, U.S. Appl. No. 17/219,457, 32 pages.

* cited by examiner

*Primary Examiner* — Cam Y T Truong
(74) *Attorney, Agent, or Firm* — Davis Wright Tremaine LLP

(57) ABSTRACT

A nodal data structure based on a first data and a second data is generated. The nodal data structure can include a first node including the first data, a second node including the second data, the second node linked to the first node, and a reference to a data structure including the first data and the second data is associated with the second node. The reference to the data structure including the first data and the second data is located using the nodal data structure generated based on the first data and the second data.

20 Claims, 18 Drawing Sheets

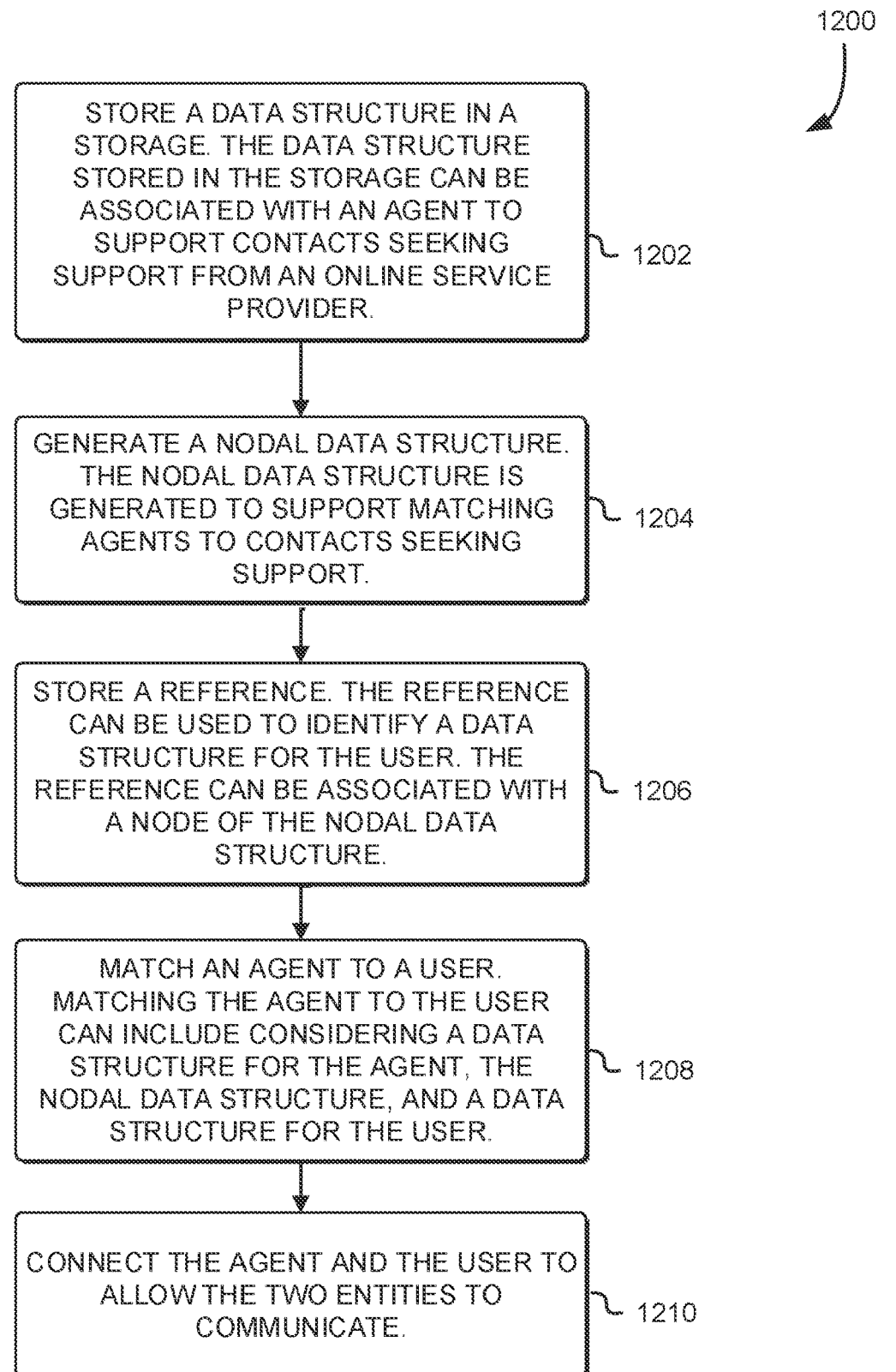

1200

STORE A DATA STRUCTURE IN A STORAGE. THE DATA STRUCTURE STORED IN THE STORAGE CAN BE ASSOCIATED WITH AN AGENT TO SUPPORT CONTACTS SEEKING SUPPORT FROM AN ONLINE SERVICE PROVIDER.          1202

GENERATE A NODAL DATA STRUCTURE. THE NODAL DATA STRUCTURE IS GENERATED TO SUPPORT MATCHING AGENTS TO CONTACTS SEEKING SUPPORT.          1204

STORE A REFERENCE. THE REFERENCE CAN BE USED TO IDENTIFY A DATA STRUCTURE FOR THE USER. THE REFERENCE CAN BE ASSOCIATED WITH A NODE OF THE NODAL DATA STRUCTURE.          1206

MATCH AN AGENT TO A USER. MATCHING THE AGENT TO THE USER CAN INCLUDE CONSIDERING A DATA STRUCTURE FOR THE AGENT, THE NODAL DATA STRUCTURE, AND A DATA STRUCTURE FOR THE USER.          1208

CONNECT THE AGENT AND THE USER TO ALLOW THE TWO ENTITIES TO COMMUNICATE.          1210

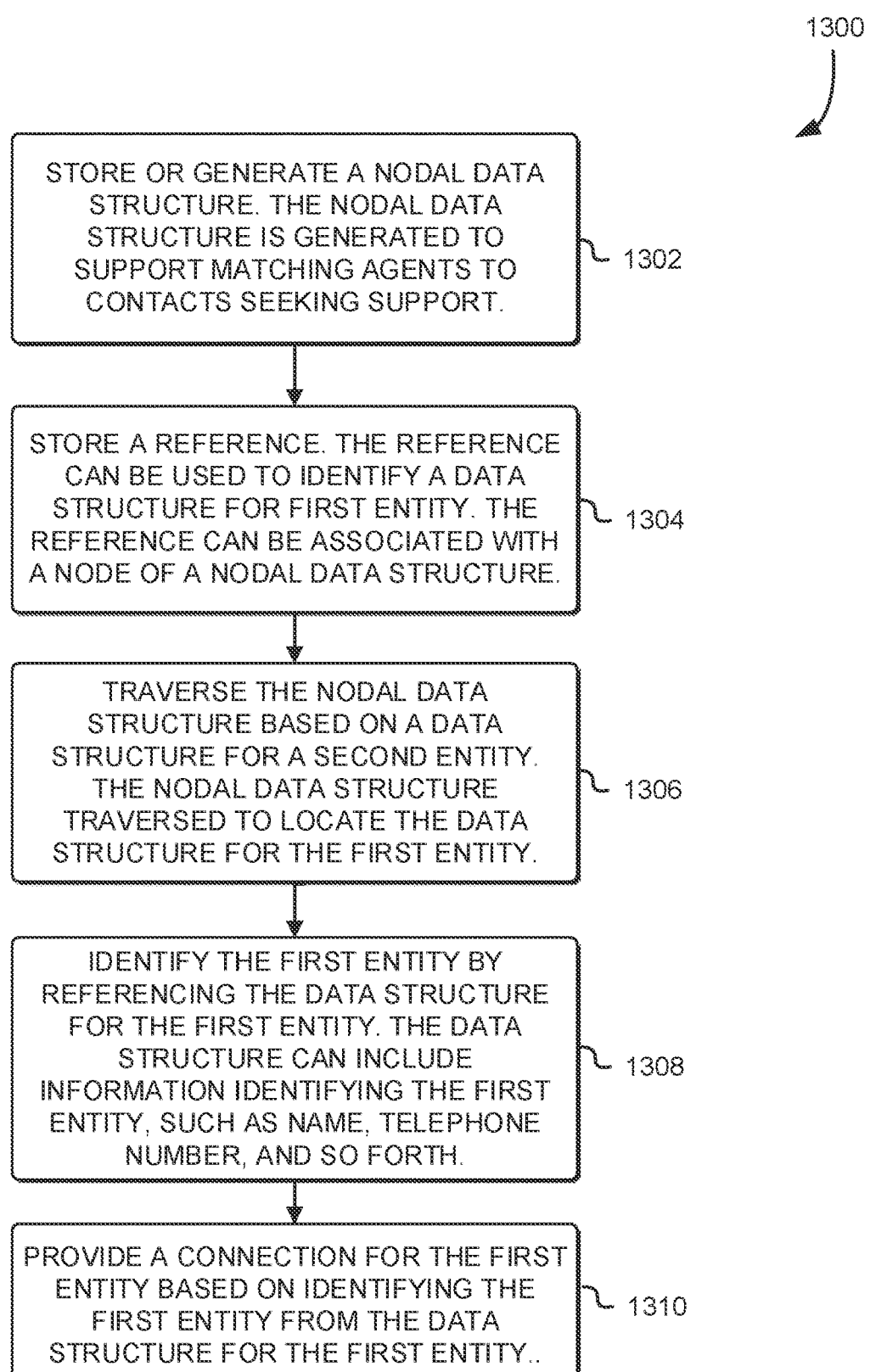

STORE OR GENERATE A NODAL DATA
STRUCTURE. THE NODAL DATA
STRUCTURE IS GENERATED TO
SUPPORT MATCHING AGENTS TO
CONTACTS SEEKING SUPPORT.

⌐ 1302

STORE A REFERENCE. THE REFERENCE
CAN BE USED TO IDENTIFY A DATA
STRUCTURE FOR FIRST ENTITY. THE
REFERENCE CAN BE ASSOCIATED WITH
A NODE OF A NODAL DATA STRUCTURE.

⌐ 1304

TRAVERSE THE NODAL DATA
STRUCTURE BASED ON A DATA
STRUCTURE FOR A SECOND ENTITY.
THE NODAL DATA STRUCTURE
TRAVERSED TO LOCATE THE DATA
STRUCTURE FOR THE FIRST ENTITY.

⌐ 1306

IDENTIFY THE FIRST ENTITY BY
REFERENCING THE DATA STRUCTURE
FOR THE FIRST ENTITY. THE DATA
STRUCTURE CAN INCLUDE
INFORMATION IDENTIFYING THE FIRST
ENTITY, SUCH AS NAME, TELEPHONE
NUMBER, AND SO FORTH.

⌐ 1308

PROVIDE A CONNECTION FOR THE FIRST
ENTITY BASED ON IDENTIFYING THE
FIRST ENTITY FROM THE DATA
STRUCTURE FOR THE FIRST ENTITY..

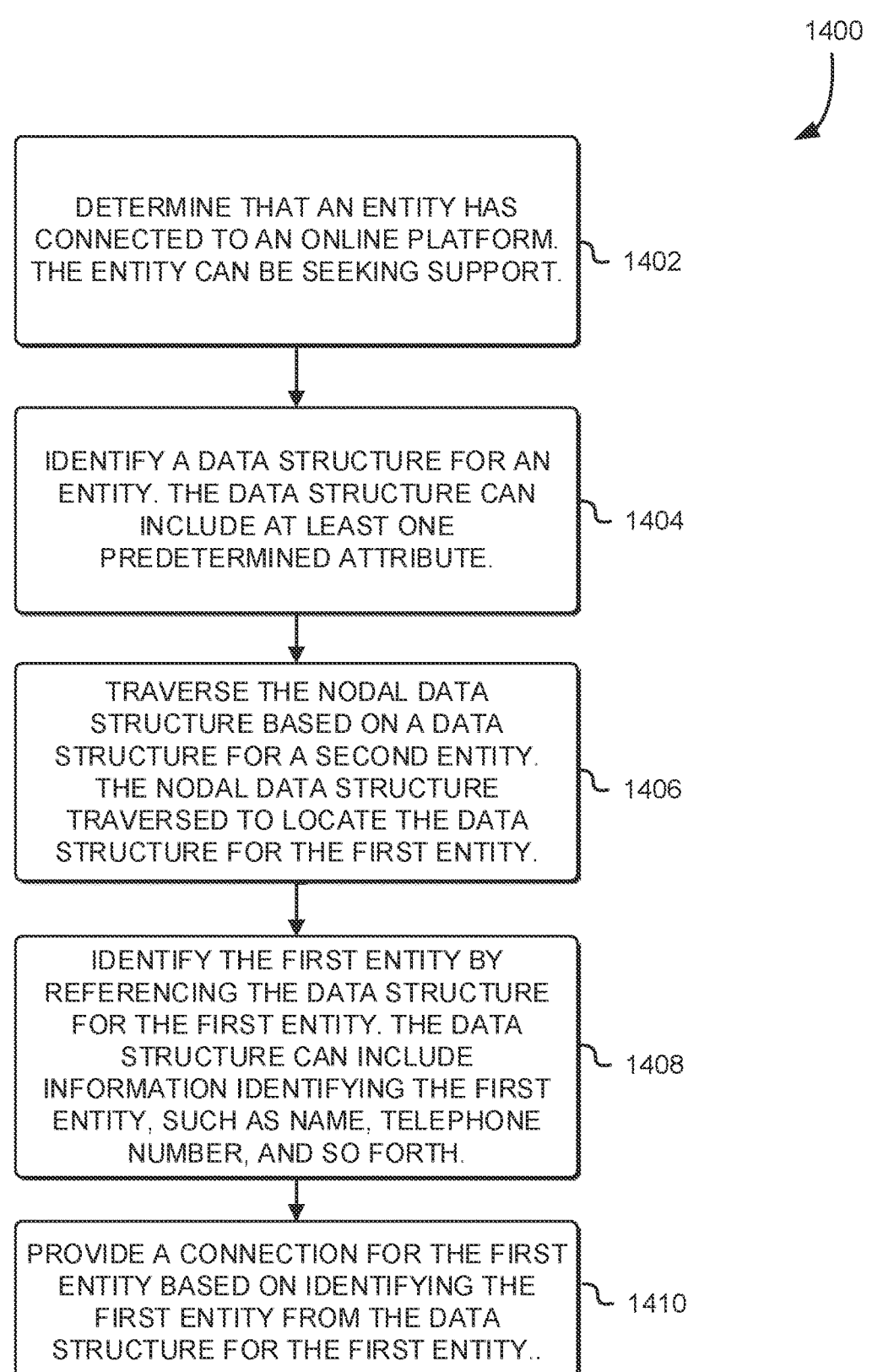

DETERMINE THAT AN ENTITY HAS CONNECTED TO AN ONLINE PLATFORM. THE ENTITY CAN BE SEEKING SUPPORT. — 1402

IDENTIFY A DATA STRUCTURE FOR AN ENTITY. THE DATA STRUCTURE CAN INCLUDE AT LEAST ONE PREDETERMINED ATTRIBUTE. — 1404

TRAVERSE THE NODAL DATA STRUCTURE BASED ON A DATA STRUCTURE FOR A SECOND ENTITY. THE NODAL DATA STRUCTURE TRAVERSED TO LOCATE THE DATA STRUCTURE FOR THE FIRST ENTITY. — 1406

IDENTIFY THE FIRST ENTITY BY REFERENCING THE DATA STRUCTURE FOR THE FIRST ENTITY. THE DATA STRUCTURE CAN INCLUDE INFORMATION IDENTIFYING THE FIRST ENTITY, SUCH AS NAME, TELEPHONE NUMBER, AND SO FORTH. — 1408

PROVIDE A CONNECTION FOR THE FIRST ENTITY BASED ON IDENTIFYING THE FIRST ENTITY FROM THE DATA STRUCTURE FOR THE FIRST ENTITY.. — 1410

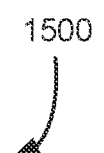

IDENTIFY A SET OF STRINGS
ASSOCIATED WITH STRINGS INCLUDED
IN DATA. THE DATA CAN BE COMPRISED
IN ELECTRONIC SOURCES, SUCH AS
DOCUMENTS AND WEBPAGES.

1502

GENERATE A DATA STRUCTURE. THE
DATA STRUCTURE CAN BE GENERATED
USING THE SET OF STRINGS. THE DATA
STRUCTURE CAN COMPRISE A ROOT
NODE AND A CHILD NODE OF THE ROOT
NODE. EACH OF THE NODES CAN
IDENTIFY A UNIQUE STRING IN THE SET
OF STRINGS.

1504

GENERATE A SEARCH RESULT, THE
SEARCH RESULT CAN BE GENERATED
USING THE DATA STRUCTURE
INCLUDING THE ROOT NODE AND THE
CHILD NODE. THE SEARCH RESULT CAN
INCLUDE REFERENCES TO ONE OR
MORE SOURCES INCLUDING STRINGS
LINKED TO THE ROOT NODE AND THE
CHILD NODE.

1600

GENERATE A DATA STRUCTURE. THE
DATA STRUCTURE CAN BE GENERATED
USING THE SET OF STRINGS. THE DATA
STRUCTURE CAN COMPRISE A ROOT
NODE AND A CHILD NODE OF THE ROOT
NODE. EACH OF THE NODES CAN
IDENTIFY A UNIQUE STRING IN THE SET
OF STRINGS.

1602

LOCATE THE REFERENCE TO THE DATA
STRUCTURE INCLUDING THE FIRST DATA
AND THE SECOND DATA. THE DATA
STRUCTURE INCLUDING THE FIRST DATA
IN THE SECOND DATA CAN BE LOCATED
USING THE DATA STRUCTURE
COMPRISING THE FIRST NODE IN THE
SECOND NODE, WHERE THE SECOND
NODE INCLUDES THE REFERENCE TO
THE DATA STRUCTURE INCLUDING THE
FIRST DATA AND THE SECOND DATA.

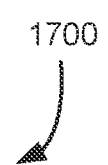
1700
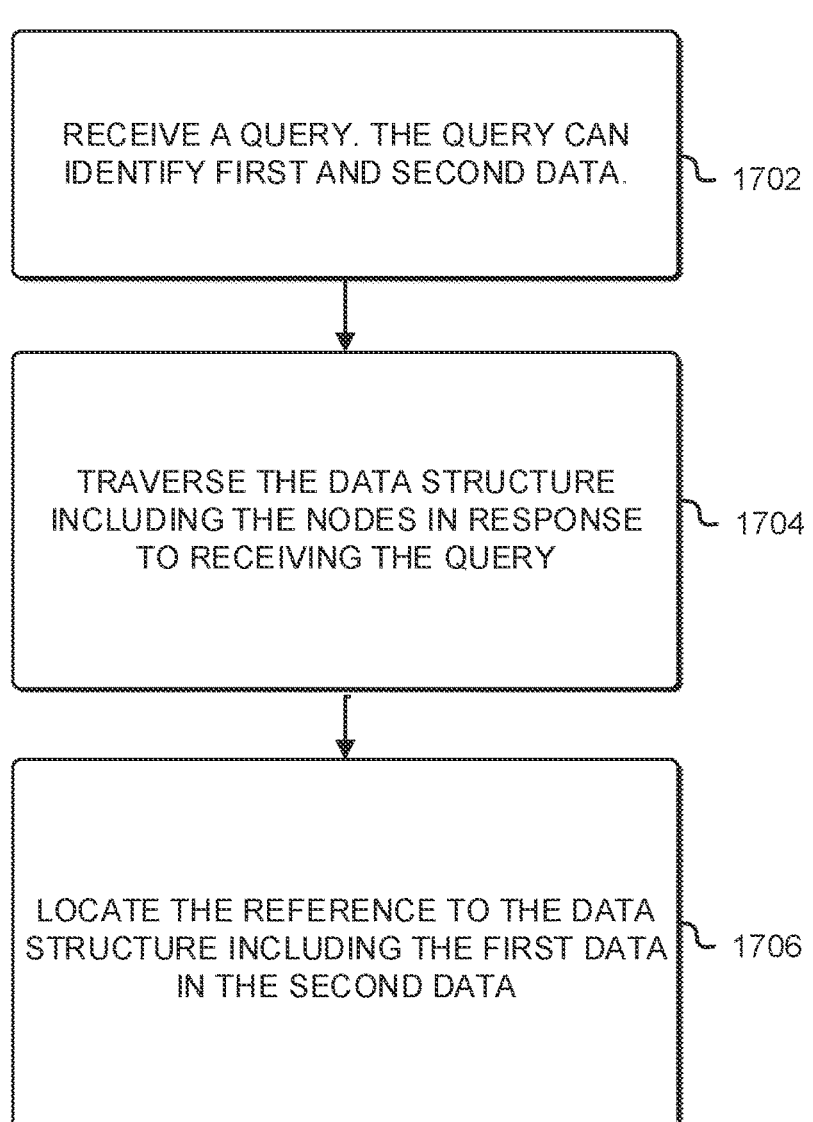
RECEIVE A QUERY. THE QUERY CAN IDENTIFY FIRST AND SECOND DATA.     1702
TRAVERSE THE DATA STRUCTURE INCLUDING THE NODES IN RESPONSE TO RECEIVING THE QUERY     1704
LOCATE THE REFERENCE TO THE DATA STRUCTURE INCLUDING THE FIRST DATA IN THE SECOND DATA     1706
FIG. 17

DATA STRUCTURE TO SUPPORT QUERY REQUESTS

CROSS-REFERENCE TO RELATED APPLICATION

This application incorporates by reference for all purposes the full disclosure of co-pending U.S. patent application Ser. No. 17/219,457, filed concurrently herewith, entitled "DATA STRUCTURE TO SUPPORT CONTACT AND RESOURCE MATCHING".

BACKGROUND

Organizations with complex operations utilize complex systems to support those operations. An organization may, for example, provide multiple different goods and/or services. Those goods or services may themselves be complex. As a result, providing support to the users of those goods or services may involve numerous different skills. While support platforms assist in management of support operations, limitations in the platforms can cause support resources to be deployed inefficiently and/or ineffectively. For example, an agent matched to a user may lack skills that may be beneficial to supporting the user. As another example, an agent matched to a user can be over qualified for what the user needs, causing the agent's skills to be available for other users who hay have more complex issues. Moreover, the infrastructure, labor, and required knowledge associated with providing a typical support platform are generally significant. Still, companies are motivated to provide robust support platforms because customers expect comprehensive product support from the companies that provide those products. However, there remain technical challenges to providing support platforms that adequately support customer needs.

BRIEF DESCRIPTION OF THE DRAWINGS

Various techniques will be described with reference to the drawings, in which:

FIG. 12 illustrates a flow diagram including various processing acts, implemented by a system environment with one or more computing devices or nodes, which provide matching of agents to contacts using a nodal data structure, in accordance with at least one embodiment;

FIG. 13 illustrates a flow diagram including various processing acts, implemented by a system environment with one or more computing devices or nodes, which provide matching of agents to contacts using a nodal data structure, in accordance with at least one embodiment;

FIG. 14 illustrates a flow diagram including various processing acts, implemented by a system environment with one or more computing devices or nodes, which provide matching of agents to contacts using a nodal data structure, in accordance with at least one embodiment;

FIG. 15 illustrates a flow diagram including various processing acts, implemented by a system environment with one or more computing devices or nodes, which provide responding to search requests using a nodal data structure, in accordance with at least one embodiment;

FIG. 16 illustrates a flow diagram including various processing acts, implemented by a system environment with one or more computing devices or nodes, which provide responding to search requests using a nodal data structure, in accordance with at least one embodiment;

FIG. 17 illustrates a flow diagram including various processing acts, implemented by a system environment with one or more computing devices or nodes, which provide responding to search requests using a nodal data structure, in accordance with at least one embodiment.

DETAILED DESCRIPTION

Figure 1:
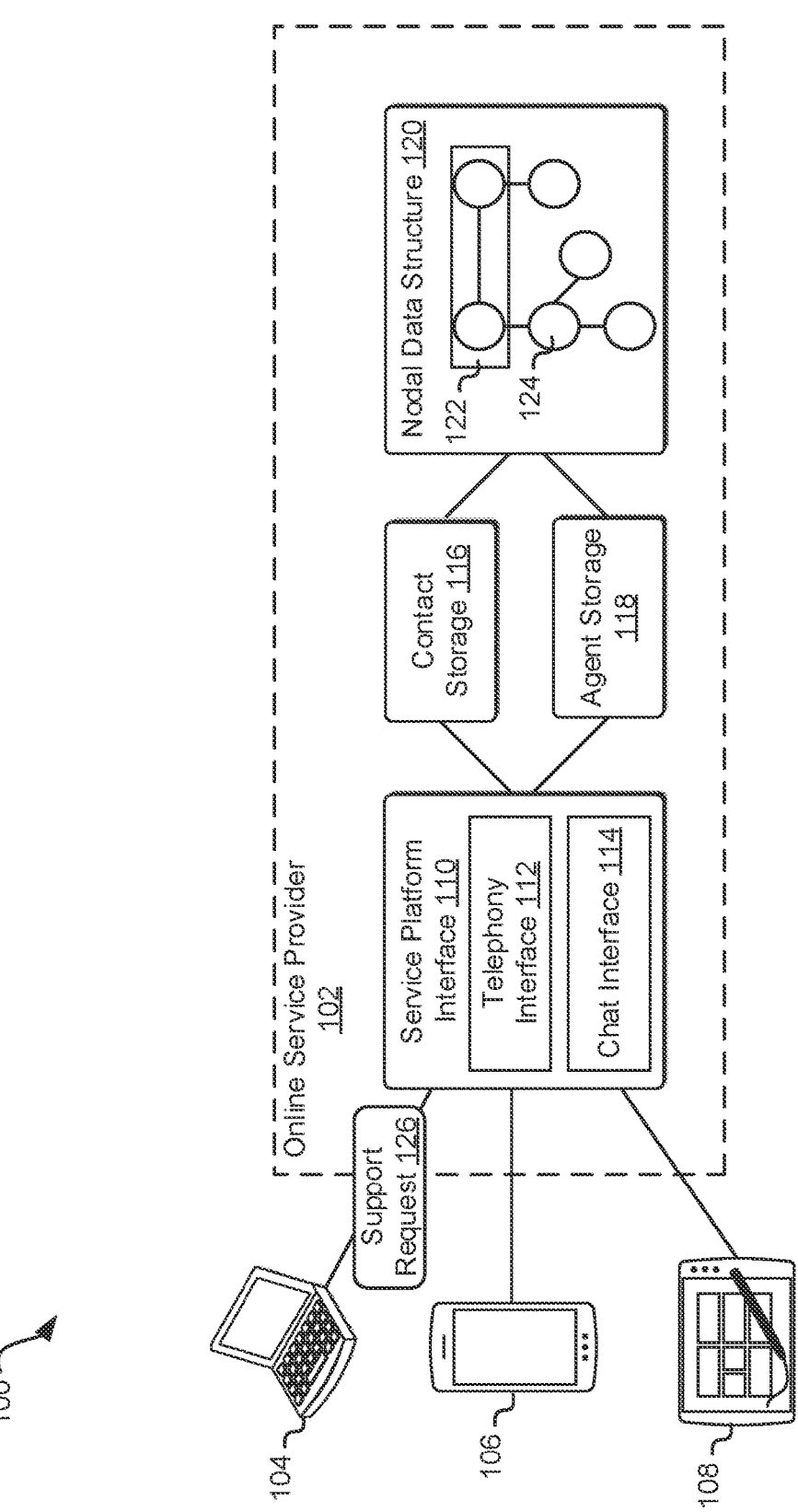
FIG. 1 illustrates a computing environment to provide a nodal data structure to support connecting contacts with agents of a support platform, in accordance with at least one embodiment.

The described techniques utilize a nodal data structure. The nodal data structure can be used to match an agent to a contact. For example, the nodal data structure, depending on how it is implemented, can be used as an index to locate contact needing support or agents that can provide support to contacts. The contact can be seeking support for a service or a product. The service or product can be a tangible item, such as a household item, vehicle, or other merchandise. Alternatively, the service or product can be an intangible item, such as a service offered by a service provider or a software product delivered electronically to a computing device or otherwise associated with the computing device. In some examples, the service or product can include a combination of physical and intangible things, such as a device that incorporates software that causes the device to perform certain functions that may be proprietary functions. The agent can be a human agent or a computer-implemented agent. In an example, the nodal data structure can be used to match a resource to a contact. The resource can be an agent to support the contact. Alternatively, the resource can be a knowledge-based repository that a contact can use to obtain answers to their support questions.

The nodal data structure can be generated based on a plurality of predetermined skills. For example, one of the plurality predetermined skills can be language, another of the plurality of predetermined skills can be a department, such as a merchandise department, and yet another of the plurality of predetermined skills can be a status or level assignable to a contact seeking support. There can be other predetermined skills. The service provider can establish a profile for the contact seeking support. That profile can include the predetermined skills associated with the contact seeking support. The service provider can use the profile and the predetermined skills included in the profile to generate the nodal data structure. The nodal data structure can be generated as a new data structure, or the profile and the predetermined skills included in the profile can be used to augment an already existing nodal data structure stored by the service provider.

The nodal data structure is generated to include at least one root node and at least one child node from the root node. The root node has associated data that identifies a first skill in the profile of the contact seeking support or otherwise assigned to the contact. The child node from the root node has associated data that identifies a second skill assigned to the contact seeking support. Each of the predetermined skills can be assigned an ordinal number. The ordinal number for a given skill is used to determine its location in the nodal data structure. For example, the first skill associated with the root node of the nodal data structure can have an ordinal number that is less than the ordinal number of the second skill associated with the child node from the root node. In general, the generated nodal data structure includes nodes sorted or arranged by skill ordinal number in ascending order. The nodal data structure can also be generated to include nodes sorted or arranged based in descending order based on ordinal numbers associated with the nodes. The nodal data structure can be referred to as an ordered nodal data structure, an indexing nodal data structure for contact and agent matching or keyword search queries, an indexing nodal data structure for string search queries, an ordered data structure, and ordered hierarchical structure.

Metadata can be associated with the child node of the nodal data structure. The metadata can include a reference to the profile of the contact seeking support. The reference, in another example, can be an electronic document generated in response to the contact connecting to the service provider to seek support. The electronic document can include data identifying the contact seeking support, information summarizing the support that the contact needs, and the skills, and associated ordinal numbers for those skills, linked to the contact seeking support. The electronic document can include data populated from the profile of the contact seeking support. The node location of the metadata in the nodal data structure is determined based on the highest ordinal number of the skills linked to the contact seeking support. Therefore, in the example nodal data structure described in the foregoing, the metadata is associated with the child node from the root node, as the ordinal number of the second skill is greater than the ordinal number of the first skill associated with the root node.

The service provider can provide agents to support contacts seeking support from the service provider. As indicated, these agents can be human agents or computer-implemented agents. Similar to contacts seeking support from the service provider, agents of the service provider can be assigned one or more of the predetermined skills. In an example, an agent is assigned a language skill (e.g., Spanish), a department skill (e.g., household merchandise), and a status or level skill that is also correspondingly assigned to some contacts seeking support. The skills assigned to the agent also have an associated ordinal number. By traversing the nodal data structure, the service provider uses the skills assigned to the agent to locate a contact seeking support. In an example, data for an agent indicates the agent is assigned the first skill and the second skill. The service provider traverses the nodal data structure to identify that the root node includes data indicating the first skill and the child node includes data indicating the second skill.

Once the skills of the agent are matched to nodes of the nodal data structure, metadata of the node with the skill having the highest ordinal number that matches the skill with the highest ordinal number assigned to the agent is analyzed to determine if there a reference to a profile of a contact seeking support. In an example, the analysis determines that the child node from the root node of the nodal data structure includes metadata with a reference to the electronic document generated in response to the contact connecting with the service provider to seek support. The service provider uses the data related to the contact seeking support, in the electronic document, to match and connect the agent to the contact. The service provider can facilitate, either through a chat or voice session, connecting the agent and contact so that the agent can address the contact's service support needs. In an example, the data related to the contact seeking support can be used to match and connect the contact to the workload that can provide one or more resources to contacts.

The nodal data structure can be used to facilitate responding to other query requests. For example, the nodal data structure can be used to generate query results in response to a keyword query. The nodal data structure can be generated to include root nodes and child nodes from the root nodes. Each of the nodes in the nodal data structure can include data identifying a string, such as a unique word or other types of unique strings, including those that might include only letters or a combination of letters, numbers, and/or other characters. In an example, the nodal data structure and the nodes of the data structure can be used as an index to search for one or more sources, such as electronic documents or webpages, that include keywords of a search query. In addition, the nodal data structure can comprise several unique nodal paths defined by root nodes and child nodes, where each of the nodes comprises data identifying string that has been assigned an ordinal number from a set of increasing ordinal numbers. In an embodiment, ordinal numbers in the set of increasing ordinal numbers can be assigned to strings only once, thereby ensuring each string has a different ordinal number compared to other strings.

In an example, the nodal data structure is generated to include nodes that each have data identifying a unique word. Some of the nodes can have associated electronic documents or other sources that include the unique words in various node combinations found in the nodal data structure. In an embodiment, a search portal receives a keyword query request. The search portal can be a search interface provided by an online service provider or other electronic interface. The keyword query request can include a plurality of words that should be found in one or more query results based on the keyword query. The plurality of words of the keyword query is used to traverse the nodal data structure. The traversal of the nodal data structure involves analyzing each of the root nodes to identify one or more root nodes that include one of the keywords from the query request. Next, based on finding at least one root node that includes data identifying one of the keywords, one or more child nodes from the root nodes is analyzed to determine if one or more of the child nodes includes a next keyword in the keywords from the query request. The node searching process is repeated until all of the keywords are located. Metadata of the child node including data identifying the last keyword in the keywords from the query request is analyzed to identify a reference to one or more electronic documents or other sources that should contain all of the keywords from the query request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described. Any number of skills can be assigned to an agent. Skills assigned to agents can be used to match an agent to a contact that is seeking support from the service provider. The nodal data structure can be used to facilitate the matching process.

As one skilled in the art will appreciate in light of this disclosure, certain embodiments may be capable of achieving certain advantages, including some or all of the following: (1) compared to conventional techniques used to match agents to contacts seeking support, the nodal data structure disclosed herein provides rapid agent and contact matching that significantly reduces computer system load in a service platform provided by a service provider; (2) similarly, the nodal data structure disclosed herein provides rapid search result generation that significantly reduces computer system load linked to a search query platform; (3) the rapid matching and query result generation provided by the nodal data structure reduces contact and agent storage backlogs resulting in a reduction in the computer storage requirements of the service platform; (4) the rapid contact and agent matching or search result generation provided by the nodal data structure directly results in reduced computer processing requirements at contact and service provider computing endpoints, etc.

FIG. 1 illustrates a computing environment 100 to provide a nodal data structure 120 to support connecting contacts with agents of a support platform, in accordance with at least one embodiment. The computing environment 100 can include an online service provider 102. The online service provider 102 can provide storage and backup services, data processing services, key management services, virtual computing services, financial services, shopping services, and many other computing and data access services. Access to the online service provider 102 is generally controlled by a variety of authentication and authorization techniques such as username/password pairs, digital certificates, network address filters, and biometric identification. When accessing the online service provider 102, a customer or contact can provide the appropriate authentication information to the online service provider 102, and the online service provider 102 grants access. In some environments, customers of the online service provider 102 obtain use of a variety of resources and services, such as computing nodes, servers, virtual machines, and other network-connected computing appliances.

As illustrated in FIG. 1, in an embodiment, contacts can connect to the online service provider 102 using a variety of computing devices. For example, a laptop computer 104, a smart phone 106, or a tablet computer 108 can be used to connect to the online service provider 102. The computing devices can include an interface, such as a software-enabled interface, that allows contacts to interface with the online service provider 102. In an embodiment, the computing devices provide one or more interfaces that enable a telephony connection with the online service provider 102 and/or a chat connection with the online service provider 102.

In an embodiment, at least one of the computing devices, such as the computing device 104, interfaces with the online service provider 102 to connect to a service platform interface 110. The service platform interface 110 can be associated with one or more servers of the online service provider 102. A contact seeking support from the online service provider 102 can communicate a support request 126 to the service platform 110. The support request 126 can be a request made over the phone, through chat, via email, by way of a webpage interface, and so on. In an embodiment, the contact seeking support from the online service provider 102 is human. In some embodiments, the contact seeking support from the online service provider 102 is a computer-implemented contact, such as a contact implemented by software, that is seeking support from the online service provider 102. Such a computer-implemented contact can be instantiated by computer-implemented instructions executed by the computing device 104. In an embodiment, the computer-implemented contact is created based on artificial intelligence determining that support is needed for goods or services identified through analysis of one or more data sources, such as data of a software package on the computing device 104, internet history accessible to the computing device 104, diagnostic logs, error reporting data, and the like. In an embodiment, the service platform interface 110 and/or other elements the online service provider 102 are associated with a service of the online service provider 110. The service may be offered to customers of the online service provider 110, such as one or more corporations, to fulfill or augment the customers' support structure to provide one or more agents to respond to support needs of contacts.

The service platform interface 110 can include a telephony interface 112 and a chat interface 114. In an embodiment, the telephony interface 112 is a hardware or software implemented interface that accepts voice over IP and/or wireline voice connections between the online service provider 102 and external computing devices, such as the computing devices 104, 106, and 108. The chat interface 114 can be a computer-implemented interface that allows agents of the online service provider 102 to interact with contacts that connect to the online service provider 102 seeking support related to products and/or services provided by the online service provider 102 or customers of the online service provider 102.

The online service provider 102 can maintain a contact storage 116 and an agent storage 118. In an example, the contact storage 116 is a contact queue. Similarly, the agent storage 118 can be an agent queue. The contact storage 116 and the agent storage 118 can be maintained in a database of the online service provider 102. The contact storage 116 can include references, such as data and the like, to one or more contacts awaiting support for a product or service associated with the online service provider 102. In an embodiment, the contact storage 116 includes profiles or electronic documents for the one or more contacts awaiting support for the product or the service associated with the online service provider 102.

The agent storage 118 can include references, such as data and the like, associated with one or more agents that can provide support to the contacts associated with the contact storage 116. In an embodiment, the agent storage 118 includes profiles of the one or more agents that can provide support to the contacts. Contacts can be associated with the contact storage 116 in sequential order based on when the contacts connected to the online service provider 102 through the service platform 118 to obtain support from the online service provider 102. In an embodiment, agent profiles are added to the agent storage 118 as agents become available to support contacts associated with the contact storage 116.

In at least one embodiment, the contact storage 116 comprises a nodal data structure. Specifically, the nodal data structure of the contact storage 116 can comprise nodes that have associated data corresponding to contacts awaiting support from the online service provider 102. The nodal data structure of the contact storage 116 can be searched to identify contact data corresponding to a contact to be assigned to an agent of the online service provider 102. Thus, the nodal data structure can provide an index for identifying contacts awaiting support. Similarly, in at least one embodiment, the agent storage 118 comprises a nodal data structure. Specifically, the nodal data structure of the agent storage 118 can comprise nodes that have associated data corresponding to agents to provide support to contacts associated with the contact storage 116. Thus, the nodal data structure can provide an index for identifying agents to provide support to contacts. The nodal data structure of the agent storage 118 can be searched to identify agent data corresponding to an agent of the online service provider 102. Contact and agents can be prioritized, by way of the respective nodal data structures of the contact storage 116 and agent storage 118 based on attributes or skills associated with the contact and agents.

In some embodiments, there can be multiple contact storages 116 and/or multiple agent storages 118. For example, there can be a contact storage 116 that includes data associated with contacts having particular attributes or skills identified as being linked to the contact storage 116. Similarly, there can be another contact storage 116 that includes data associated with contacts that have been assigned other attributes or skills identified as being linked to the other contact storage 116. In the same manner, in an embodiment, there can be an agent storage 118 that includes data associated with agents having particular attributes or skills identified as being linked to the agent storage 118. Furthermore, there can be another agent storage 118 that includes data associated with agents that have been assigned other attributes or skills identified as being linked to the other agent storage 118.

The online service provider 102 maintains the nodal data structure 120. The nodal data structure 120 can be maintained in a computer-implemented storage of the online service provider 102. In an embodiment, the nodal data structure 120 is an in-memory data structure. Specifically, the nodal data structure 120 can be maintained in memory of the online service provider 102 that facilitates rapid response time when accessing and modifying the nodal data structure 120. In an embodiment, the nodal data structure 120 is stored in fast access hardware, such as random access memory (RAM) that provides submillisecond latency. The nodal data structure 120 can be persisted on discs, such as one or more SSDs, to guard against data loss in the event of a failure of the fast access hardware.

In an embodiment, the nodal data structure 120 is used by the online service provider 102 to match agents associated with the agent storage 118 to contacts associated with the contact storage 116. In an embodiment, the nodal data structure 120 is used by a customer of the online service provider 102 to match agents associated with the agent storage 118 to contacts associated with the contact storage 116. In at least one embodiment, the nodal data structure 120 provides an index for identifying contacts awaiting support. The nodal data structure 120 can include one or more root nodes 122. Furthermore, the nodal data structure 120 can include one or more child nodes 124 connected to or from the one or more root nodes 122. The nodes of the nodal data structure 120 can comprise data. In an embodiment, the data associated with the nodes can identify skills associated with contacts and agents. In some embodiments, the data associated with the nodes can identify attributes associated with contacts and agents. Skills associated with the contacts and agents are also referred to herein as tags that can be associated with the nodes of the nodal data structure 120. In an embodiment, each tag represents a skill that can be assigned to contacts and agents. There can be a plurality of skills available to be associated with contacts and agents. The skills can include language type (e.g., English, Spanish, etc.), department (e.g., merchandise department), contact (i.e., user, customer, or other entity) status (e.g., contact level according to the online service provider 102, member or nonmember of the online service provider 102, premium or nonpremium contact, etc.), and the like. Skills and/or attributes can be selected from a set of predetermined skills and/or attributes provided by the online service provider 102. In at least some embodiments, the skills and/or attributes can be defined by the online service provider 102 and/or customers of the online service provider 102. Additionally, proficiencies such as levels of proficiencies can be associated with each of the skills and/or attributes. The online service provider 102 and/or customers of the online service provider 102 can set the level of proficiency for each of the skills and/or attributes.

A node of the nodal data structure 120 can refer to an element that represents data within the structure. A node can represent any type of data or content, such as, for example, strings, contact data, agent data, or any other type of data, such as data associated with strings, contacts, and/or agents. The nodal data structure 120 can include a root node and an end node, or plurality thereof. A root node can be a node that does not have, or is not linked to, a superior or predecessor node. An end node can be a node that does not have any children or successor nodes. A link refers to a relationship or a "line" between nodes or elements. The nodal data structure 120 can include a root node and an end node, or plurality thereof. A root node can refer to a node that does not have, or is not linked to, a superior or predecessor node. A root node might also be referred to as a starting node. An end node can refer to a node that does not have any children or successor nodes. A child node can refer to a node that extends from and succeeds another node (the parent node). In contrast, a parent node can refer to a node that extends from and precedes another node (the child node).

At least some of the nodes of the nodal data structure 120 can include a reference to data identifying a contact awaiting support from the online service provider 102. The contact awaiting support from the online service provider 102 can be identified by data associated with the contact storage 116. The data identifying the contact awaiting support from the online service provider 102 can be associated with a stored profile or electronic document linked to the contact. The stored profile or electronic document can identify contact information for the contact, skills, tags, and/or attributes assigned to the contact, timestamp information pertaining to when the contact initiated a support request, and other identifying information for the contact. The skills, tags, and/or attributes assigned to the contact can also be associated with one or more agents that are able to provide support to contacts that contact the online service provider 102 to obtain support. The agent, also referred to herein as a resource, can be a human agent or a computer-implemented agent. In an example, the nodal data structure can be used to match a resource to a contact. The resource can be an agent to support the contact. Alternatively, the resource can be a knowledge-based repository that a contact can use to obtain answers to their support questions. Alternatively, the resource can contain advertisements or other information that can be of interested to contact. In another example, the resource can be a computer storage that contains other data relevant to data associated with the nodes of the nodal data structure.

In an embodiment, the skills, tags, and/or attributes assigned to the contact can be toggled to expire after a period of time from being assigned to the contact awaiting support. Specifically, some or all of the skills, tags, and/or attributes associated with the stored profile or electronic document can be caused to be removed therefrom through compute processes provided by the online service provider 102. In an embodiment, the online service provider 102 stores data in compute resources of the online service provider 102 indicating a time that the skills, tags, and/or attributes were assigned to the contact. The stored data can also indicate a expiry time that the skills, tags, and/or attributes are to be removed from the stored profile or the electronic document associated with the contact. When the expiry time is reached, the online service provider 102 can remove the skills, tags, and/or attributes from the stored profile or the electronic document associated with the contact. In addition, expiration of the skills, tags, and/or attributes can additionally cause the online service provider 102 to modify the nodal data structure 122 to remove one or more nodes, corresponding to the expired skills, tags, and/or attributes, from the nodal data structure 122.

The nodal data structure 120 can be searched to match an agent to support a contact seeking support from the online service provider 102. Thus, the nodal data structure 120 can provide an index for identifying contacts awaiting support. In an embodiment, data associated with an agent available to support contacts is obtained from the agent storage 118. The data associated with the agent can include a plurality of skills, tags, and/or attributes associated with the agent. The data associated with the agent can be included in a profile for the agent, which is stored by the online service provider 102. The plurality of skills in the data associated with the agent can be sorted based on ordinal numbers linked to individual skills of the plurality of skills. In an embodiment, the individual skills of the plurality of skills are sorted in ascending order based on the ordinal numbers. For example, a skill having an ordinal number that is less than another skill's ordinal number will precede the other skill in the sorted set of skills associated with the data of the agent.

The data associated with the agent available to support contacts is analyzed to identify the skills sorted by ordinal numbers. The analysis of the data can include sorting the skills identified in the agent data. The online service provider 102 analyzes the nodal data structure 122 to determine if a first skill, with the least most ordinal number, is identified in data of one or more root nodes 122 of the nodal data structure 120. When the first skill is found in data of at least one root node 122, data of a child node 124 of the root node 122 containing the data of the first skill is analyzed to determine if a second skill, with the next least most ordinal number, is found in the data of the child node 124. The second skill is included in the data associated with the agent available to support contacts. The foregoing process is repeated for each skill in the data associated with the agent.

In addition, based on the described traversal of the nodal data structure 120, each node of the data structure 120 that includes data identifying the skill that is linked to the agent is analyzed to determine if the node includes a reference to data identifying a contact awaiting support from the online service provider 102. The reference can be included in metadata of the node. When a single reference identifying a contact awaiting support from the online service provider 102 is identified from traversing the nodal data structure 120, the reference is used to access data of the contact to facilitate establishing a connection between the contact and the agent available to support contacts. When a plurality of references associated with contacts is identified from traversing the nodal data structure 120, data associated with the plurality of references can be analyzed to determine which contact has been waiting longest to obtain support from the online service provider 102. Specifically, the data associated with the plurality references can include a timestamp information identifying when contacts requested support of the online service provider 102. In an embodiment, the longest waiting contact is assigned to the agent available to support contacts of the online service provider 102.

Figure 2:
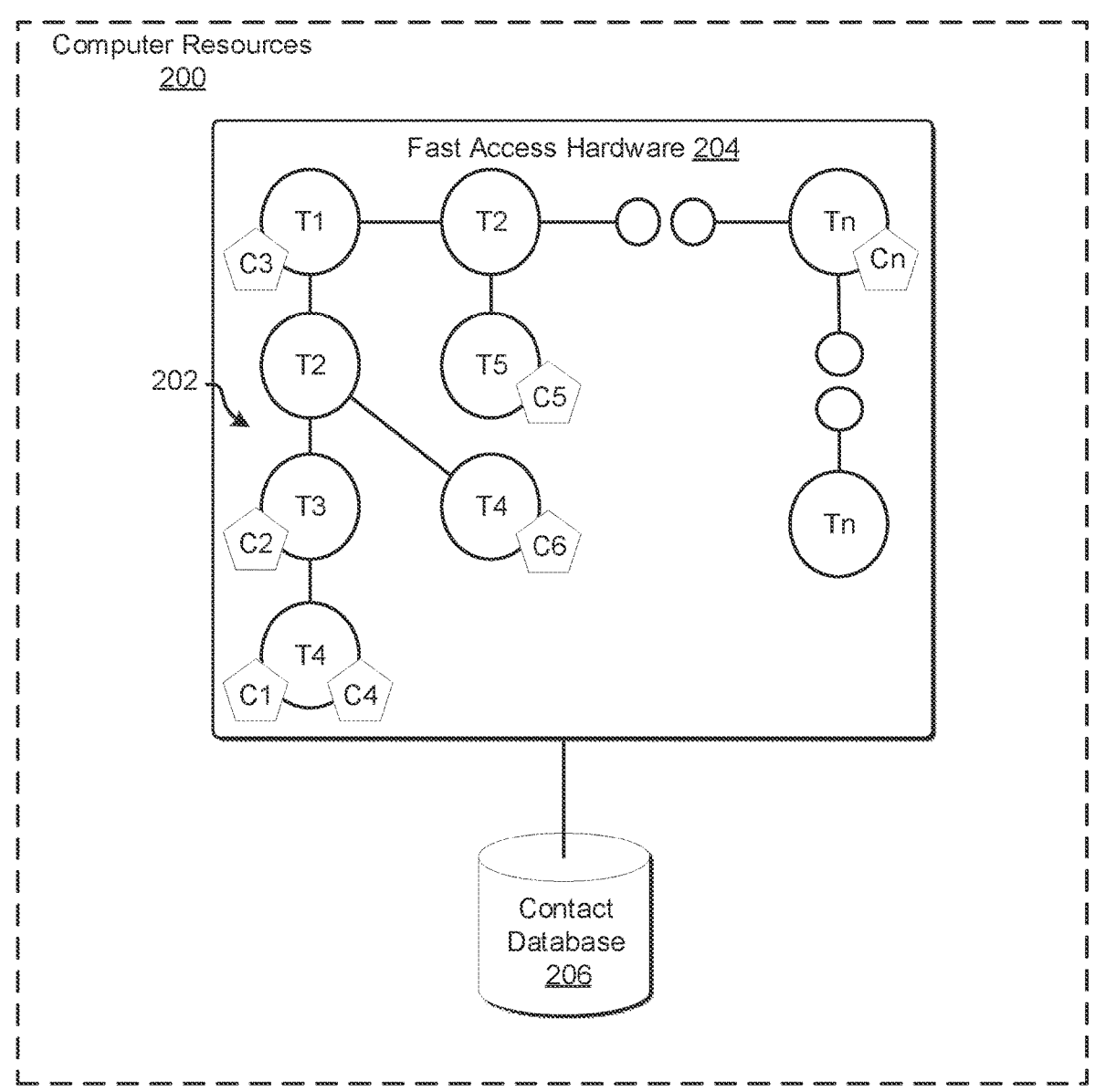
FIG. 2 illustrates computer resources that may include a nodal data structure, in accordance with at least one embodiment.

FIG. 2 illustrates computer resources 200 that may include a nodal data structure 202, in accordance with at least one embodiment. In an embodiment, the nodal data structure 202 is stored in fast access hardware 204. The fast access hardware 204 can be embodied in RAM and associated with one or more dual in-line memory modules (DIMMs), or the like.

In an embodiment, the computer resources 200 are associated with an online service provider, such as the online service provider 102 illustrated in FIG. 1. Furthermore, in an embodiment, the nodal data structure 202 can be generated by the online service provider based on data associated with contacts seeking support. Such data can be stored in a contact database 206. The data stored in the contact database 206 can include contact profiles. Some or all of the contact profiles can include contact information, such as email addresses, telephone numbers, skills associated with the contacts, such as skills associated with tags, attributes, and so on.

The nodal data structure 202 can include one or more root nodes, such as root nodes identified by tags T1 and T2. In addition, the nodal data structure 202 can include one or more child nodes, identified by tags T2, T3, T4, T5, and T4. The illustrated number of root nodes and child nodes of the nodal data structure 202 is non-limiting, as the nodal data structure 202 can be generated to include any number of root nodes and child nodes. In the foregoing, T is a tag corresponding to a unique skill or attribute, and the number associated with T equals a unique ordinal number assigned to the unique skill or attribute. The Tn format allows for sorting tags for placement in the nodal data structure 202 in ascending order based on tag ordinal numbers.

The nodal data structure 202 can also include references Cn to data stored in a computer resources 200. In an embodiment, each of the references Cn refers to data of a contact awaiting support for goods or services. The data of the contacts awaiting support for goods or services can be stored in the contact database 206. The data of the contacts awaiting support can include one or more of the tags associated with nodes of the nodal data structure 202.

Figure 3:
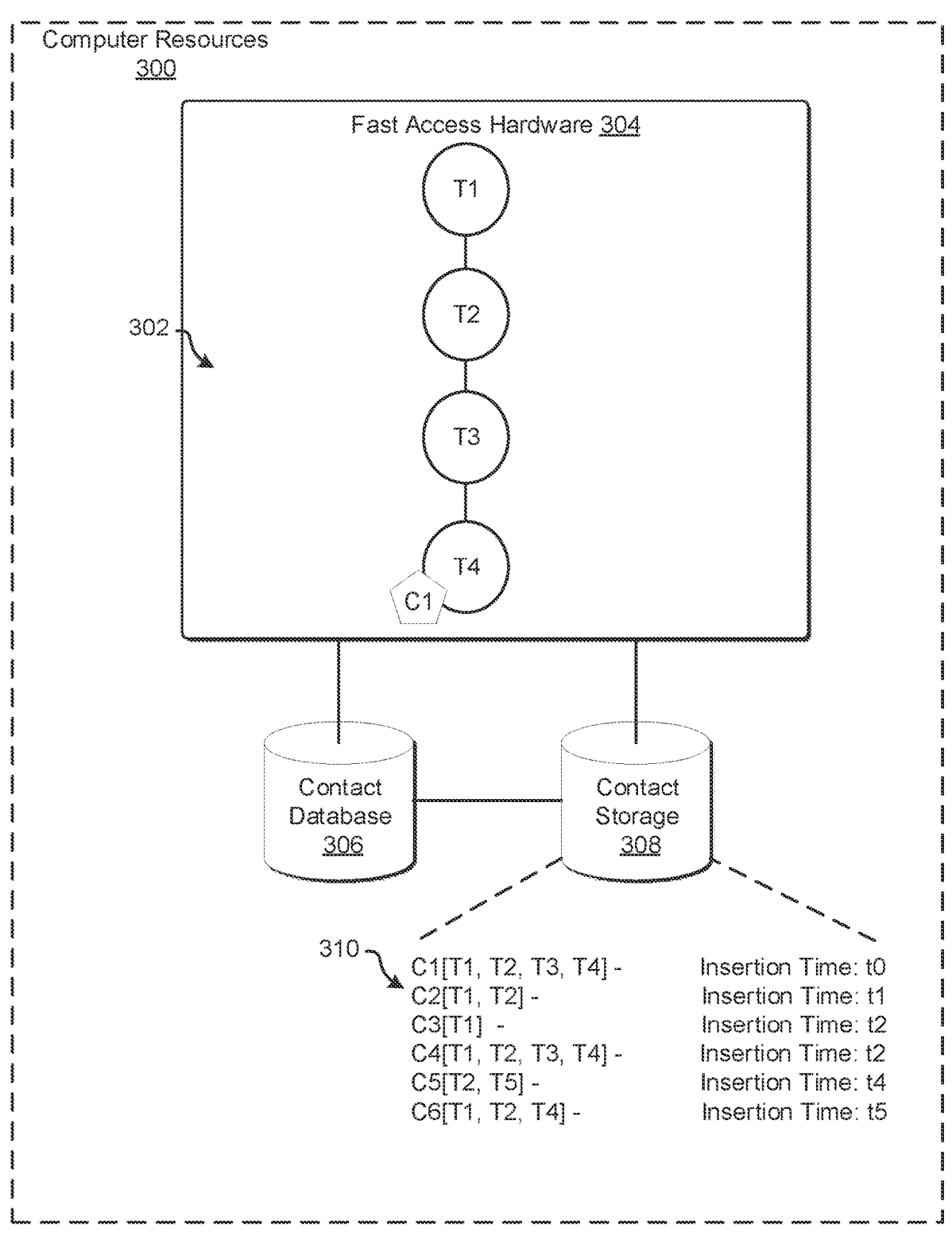
FIG. 3 illustrates techniques for generating or augmenting a nodal data structure, in accordance with at least one embodiment.

FIG. 3 illustrates techniques for generating or augmenting a nodal data structure 302, in accordance with at least one embodiment. The nodal data structure 302 can be stored in fast access hardware 304 associated with computer resources 300. The fast access hardware 304 can be connected to a contact database 306 and a contact storage 308. In an embodiment, the contact database 306 and the contact storage 308 can be operatively coupled to allow for sharing data between the two computer-implemented storages.

The contact storage 308 can include data corresponding to a plurality of contacts 310 awaiting support from an online service provider. In an embodiment, each of the plurality of contacts 310 awaiting support is represented by a contact number (e.g., C#), tags and associated ordinal number (e.g., T #), and the time (e.g., insertion time) the contact number was inserted into the contact storage 308. Contact information, such as email address, telephone number, and the like, associated with the contacts can be included in the data in the contact storage 308. The contact data of the contact storage 308, as indicated, is used to augment or generate the nodal data structure 302. In an embodiment, the plurality of contacts 310 are sorted based on insertion time. Specifically, data of the longest waiting contact awaiting support should be at the front of the storage 308. In an embodiment, once a contact awaiting support is matched with an agent using the nodal data structure 302, the data of that contact is removed from the contact storage 308.

FIG. 3 illustrates the nodal data structure 302 with the tags of contact number C1 inserted into the data structure 302. The tags are inserted into the nodal data structure 302 in ascending order based on ordinal number. As illustrated, tag T1 is inserted as a root node of the nodal data structure 302. Tag T2 is inserted as a child node of the root node T1. Tag T3 is inserted as a child node of the child node T2, and tag T4 is inserted as a child node of the child node T3. Once all the tags of the contact number C1 are inserted into the nodal data structure 302, a reference C1 is associated with the child node T4. The reference C1 can link to data, such as an electronic document or profile, comprising information about the contact seeking support. In an embodiment, the data can include tags T1-T4. These tags T1-T4 should match tags assigned to an agent to support the contact seeking support. In an embodiment, data associated with the reference C1 as well as other such references can be stored in computer-implemented storage of the computer resources 300.

The data associated with the reference C1 at node T4 can include contact information, such as an email address, telephone number, and the like, for the contact seeking support from the online service provider. However, in general, this contact information should not be needed to arrange a connection between an agent assigned to support the contact seeking support and the contact. Specifically, contacts awaiting support from the online service provider, associated with the contact storage 308, should already be connected to the online service provider through a service platform interface of the online service provider, such as the service platform interface 110 illustrated in FIG. 1.

Figure 4:
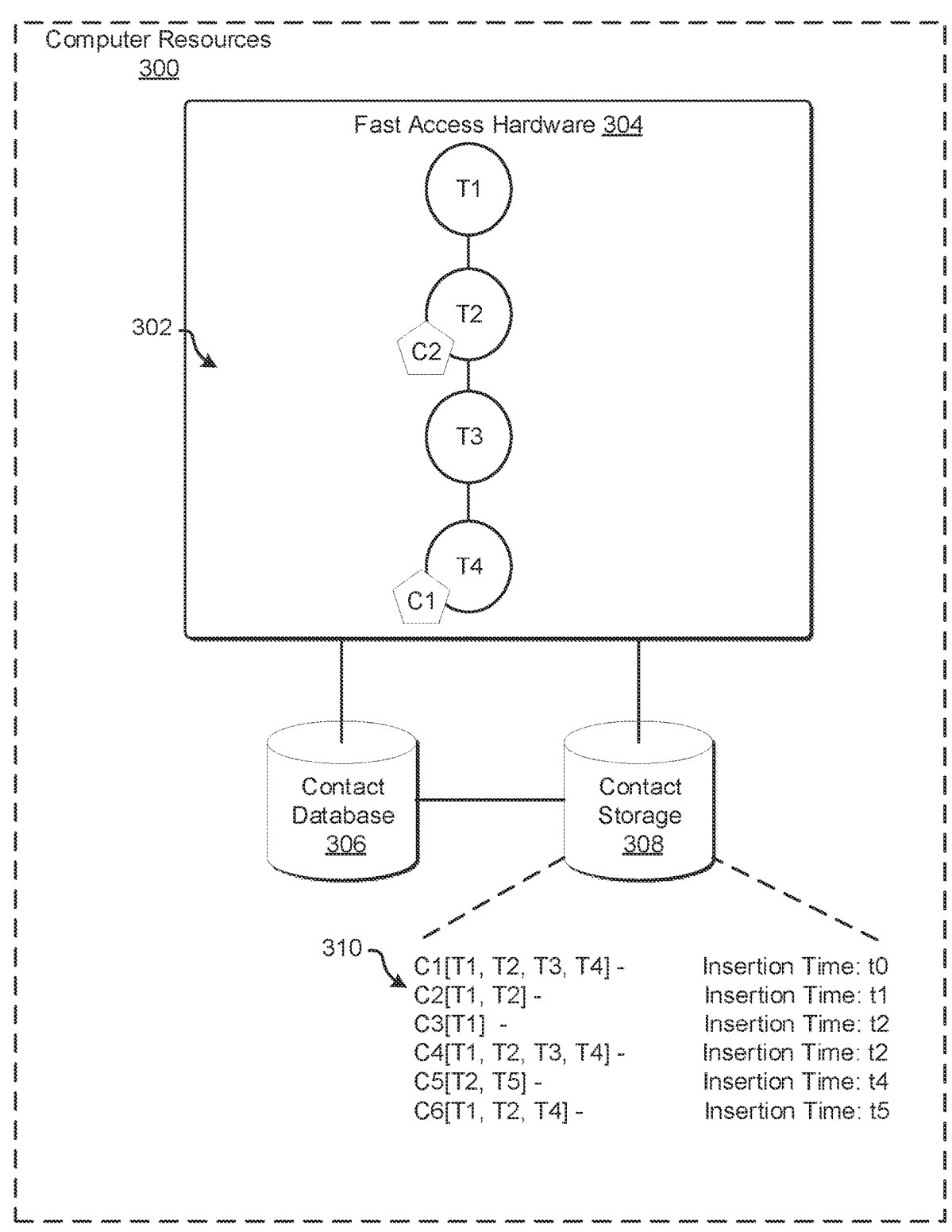
FIG. 4 illustrates techniques for generating or augmenting the nodal data structure, in accordance with at least one embodiment.

FIG. 4 illustrates techniques for generating or augmenting the nodal data structure 302, in accordance with at least one embodiment. FIG. 4 illustrates the nodal data structure 302 with the tags of contact number C2 considered with reference to the context you 308 in the contacts 310. In an embodiment, the tags of contact number C2 are considered and the nodal data structure 302 is analyzed to determine if the tags of contact number C2 should be added to the nodal data structure 302. Analysis of the nodal data structure 302 reveals that tags T1 and T2 are already present in the nodal data structure 302 and in the order associated with the contact number C2. Thus, adding the tags T1 and T2 from the contact number C2 to the nodal data structure 302 is not necessary. Therefore, in an embodiment, a reference C2 is associated with the child node T2. The reference C2 can link to data, such as an electronic document, comprising information about the contact seeking support from the online service provider. In an embodiment, the data can include tags T1-T2. These tags T1-T2 should match tags assigned to an agent to support the contact seeking support.

The data associated with the reference C2 at node T2 can include contact information, such as an email address, telephone number, and the like, for the contact seeking support from the online service provider. However, in general, this contact information should not be needed to arrange a connection between an agent assigned to support the contact seeking support and the contact. Specifically, contacts awaiting support from the online service provider, associated with the contact storage 308, should already be connected to the online service provider through a service platform interface of the online service provider, such as the service platform interface 110 illustrated in FIG. 1.

Figure 5:
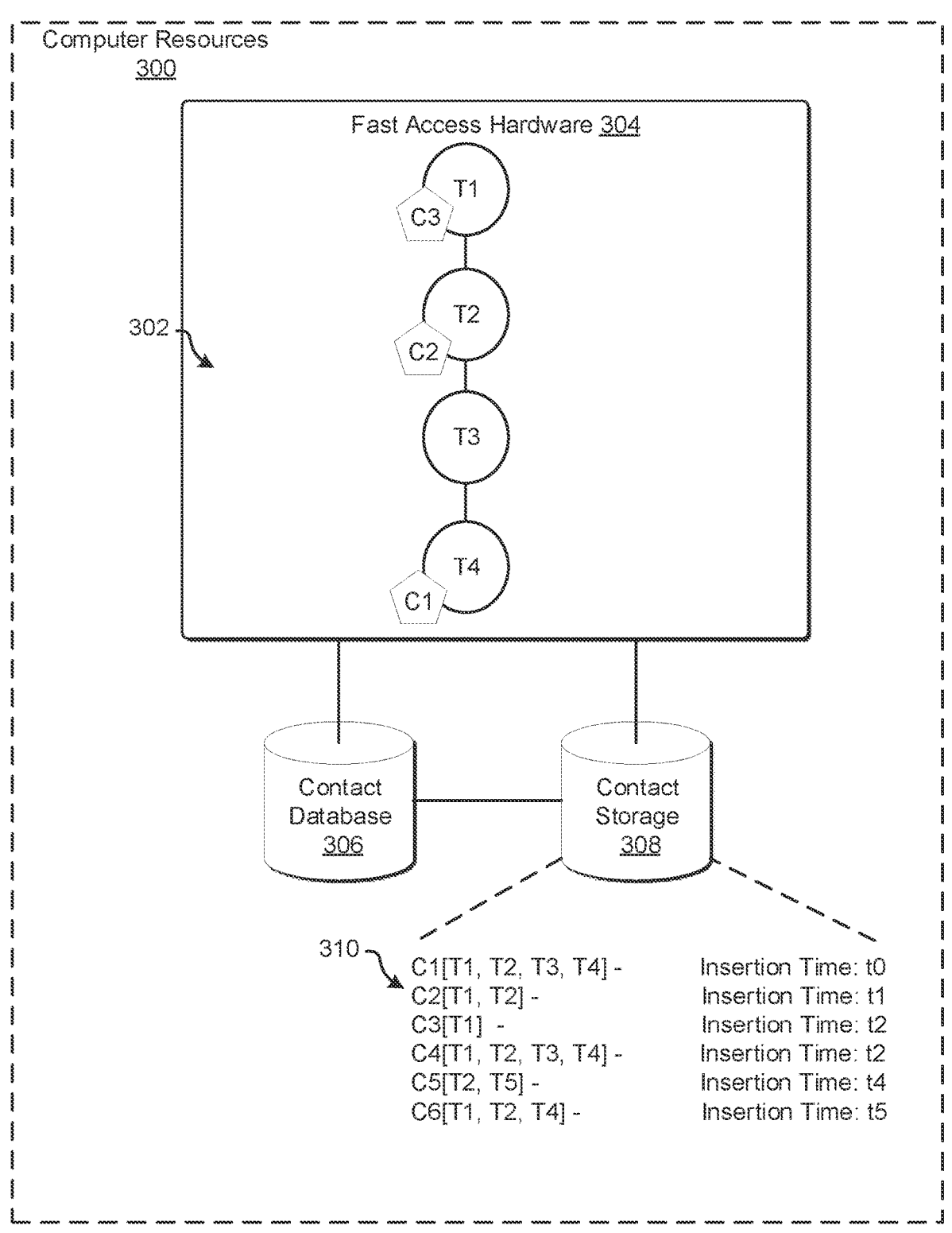
FIG. 5 illustrates techniques for generating or augmenting the nodal data structure, in accordance with at least one embodiment.

FIG. 5 illustrates techniques for generating or augmenting the nodal data structure 302, in accordance with at least one embodiment. FIG. 5 illustrates the nodal data structure 302 with the tag of contact number C3 considered with reference to the contact storage 308 in the context 310. In an embodiment, the tag of contact number C3 is considered and the nodal data structure 302 is analyzed to determine if the tag of contact number C3 should be added to the nodal data structure 302. Analysis of the nodal data structure 302 reveals that tag T1 is already present in the nodal data structure 302. Thus, adding the tag T1 from the contact number C3 to the nodal data structure 302 is not necessary. Therefore, in an embodiment, a reference C3 is associated with the root node T1. The reference C3 can link to data, such as an electronic document, comprising information about the contact seeking support from the online service provider. In an embodiment, the data can include tag T1. This tag T1 should match one or more tags assigned to an agent to support the contact seeking support.

The data associated with the reference C3 at node T1 can include contact information, such as an email address, telephone number, and the like, for the contact seeking support from the online service provider. However, in general, this contact information should not be needed to arrange a connection between an agent assigned to support the contact seeking support and the contact. Specifically, contacts awaiting support from the online service provider, associated with the contact storage 308, should already be connected to the online service provider through a service platform interface of the online service provider, such as the service platform interface 110 illustrated in FIG. 1.

Figure 6:
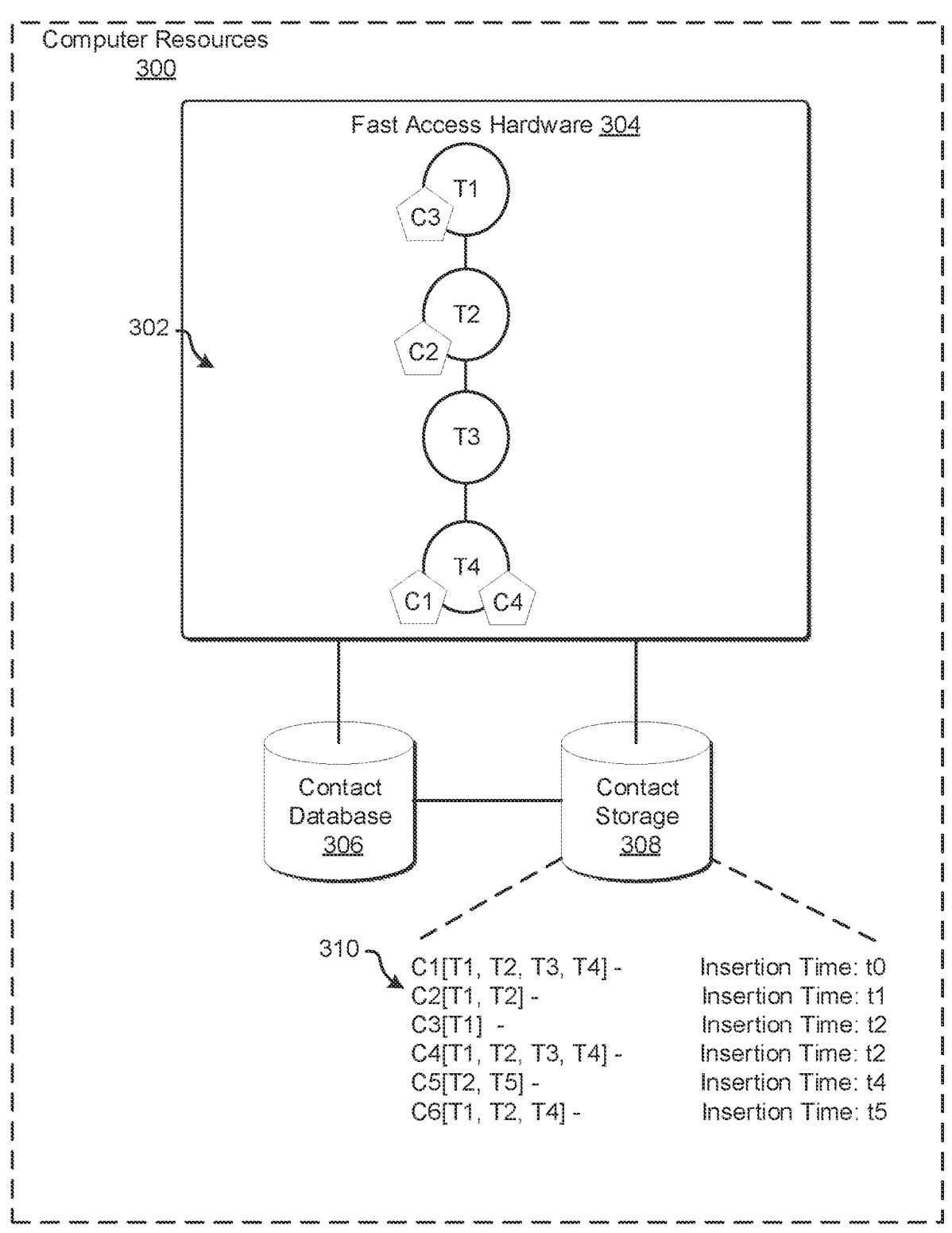
FIG. 6 illustrates techniques for generating or augmenting the nodal data structure, in accordance with at least one embodiment.

FIG. 6 illustrates techniques for generating or augmenting the nodal data structure 302, in accordance with at least one embodiment. FIG. 6 illustrates the nodal data structure 302 with the tags of contact number C4 considered with the contact storage 308 in the contacts 310. In an embodiment, the tags of contact number C4 are considered and the nodal data structure 302 is analyzed to determine if the tags of contact number C4 should be added to the nodal data structure 302. Analysis of the nodal data structure 302 reveals that tags T1-T4 are already present in the nodal data structure 302 and match the order of the tags associated with the contact number C4. Thus, adding the tags T1-T4 from the contact number C4 to the nodal data structure 302 is not necessary. Therefore, in an embodiment, a reference C4 is associated with the child node T4. The reference C4 can link to data, such as an electronic document, comprising information about the contact seeking support from the online service provider. In an embodiment, the data can include tags T1-T4. These tags T1-T4 should match tags assigned to an agent to support the contact seeking support.

The data associated with the reference C4 at node T4 can include contact information, such as an email address, telephone number, and the like, for the contact seeking support from the online service provider. However, in general, this contact information should not be needed to arrange a connection between an agent assigned to support the contact seeking support and the contact. Specifically, contacts awaiting support from the online service provider, associated with the contact storage 308, should already be connected to the online service provider through a service platform interface of the online service provider, such as the service platform interface 110 illustrated in FIG. 1.

Figure 7:
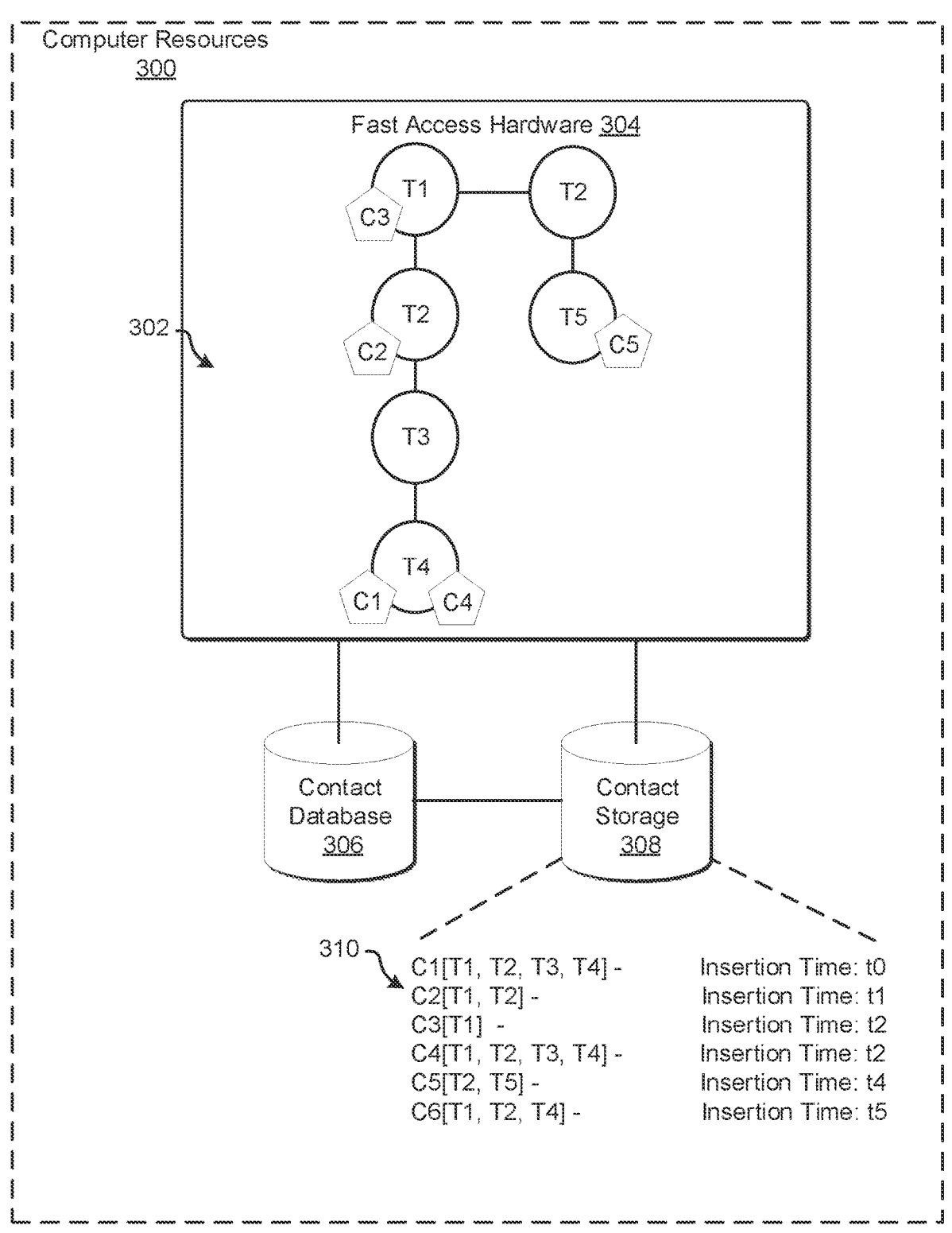
FIG. 7 illustrates techniques for generating or augmenting the nodal data structure, in accordance with at least one embodiment.

FIG. 7 illustrates the nodal data structure 302 with the tags of contact number C5 inserted into the data structure 302. The nodal data structure 302 is analyzed to determine if the tags T2 and T5 of contact number C5 are already included in the nodal data structure 302. Analysis shows that while the tag T2 is part of the nodal data structure 302, the tag ordering of T2 and T5 of the contact number C5 is not found in the nodal data structure 302. Thus, analysis shows that augmentation of the nodal data structure 302 is necessary. As illustrated, tag T2 is inserted as a root node of the nodal data structure 302. Tag T5 is inserted as a child node of the root node T2. A reference C5 is associated with the child node T5. The reference C5 can link to data, such as an electronic document, comprising information about the contact seeking support from the online service provider. In an embodiment, the data can include tags T2 and T5. These tags T2 and T5 should match tags assigned to an agent to support the contact seeking support.

The data associated with the reference C5 at node T5 can include contact information, such as email address, telephone number, and the like, for the contact seeking support from the online service provider. However, in general, this contact information should not be needed to arrange a connection between an agent assigned to support the contact seeking support and the contact. Specifically, contacts awaiting support from the online service provider, associated with the contact storage 308, should already be connected to the online service provider through a service platform interface of the online service provider, such as the service platform interface 110 illustrated in FIG. 1.

Figure 8:
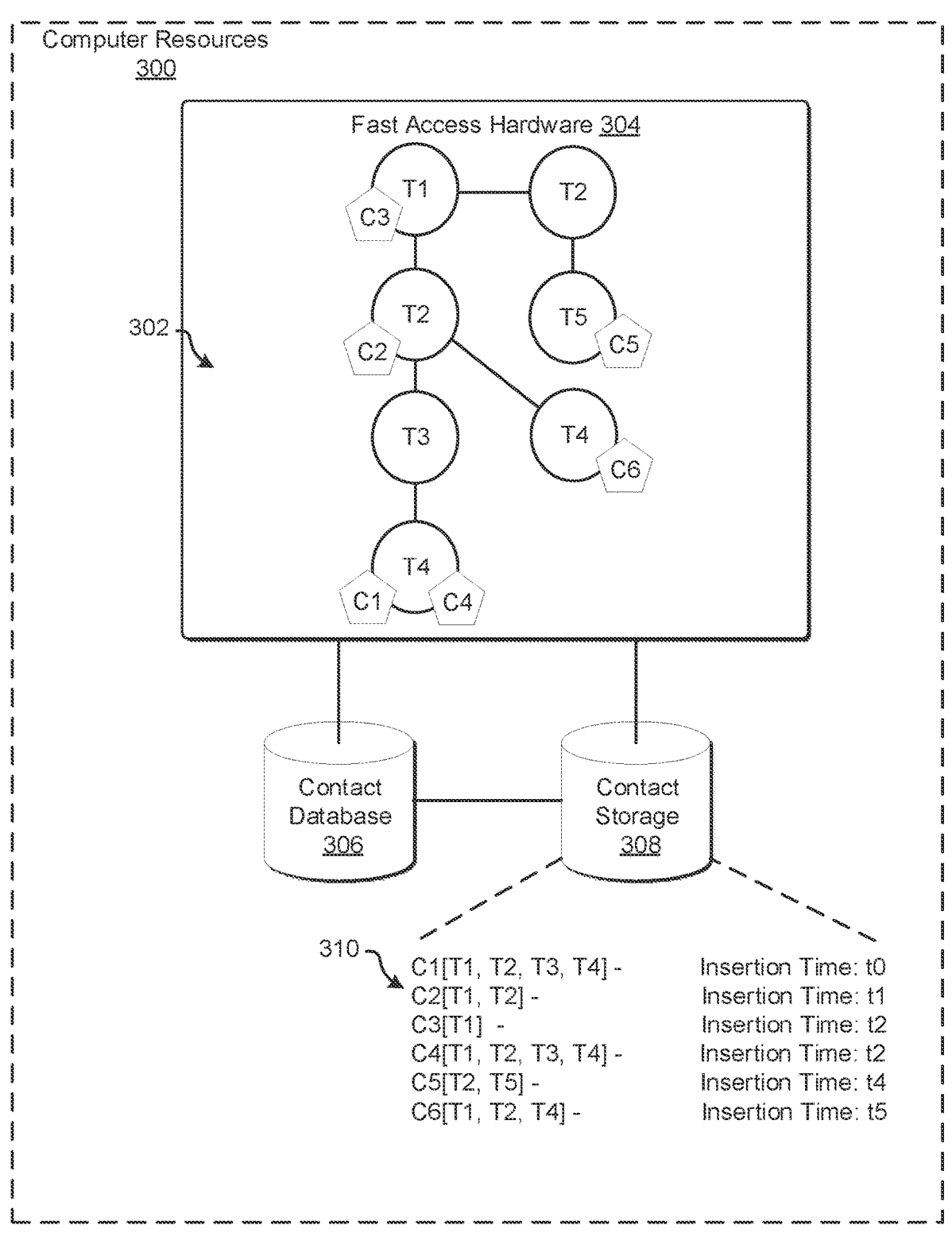
FIG. 8 illustrates techniques for generating or augmenting the nodal data structure, in accordance with at least one embodiment.

FIG. 8 illustrates the nodal data structure 302 with the tags of contact number C6 inserted into the data structure 302. As illustrated, analysis of the nodal data structure 302 indicates that tags T1 and T2 are already associated with child nodes of the nodal data structure 302. However, the analysis of the nodal data structure 302 indicates that tag T4 is not yet part of the nodal data structure 302, as a child node of child node T2. Thus, the nodal data structure 302 is traversed based on the tags linked to the contact number C6 to insert tag T4 associated with a child node of the child node T2. A reference C6 is associated with the child node T4 of child node T2. The reference C6 can link to data, such as an electronic document, comprising information about the contact seeking support from the online service provider. In an embodiment, the data can include tags T1, T2, and T4. These tags T1, T2, and T4 should match tags assigned to an agent to support the contact seeking support.

The data associated with the reference C6 at node T4 from node T2 can include contact information, such as email address, telephone number, and the like, for the contact seeking support from the online service provider. However, in general, this contact information should not be needed to arrange a connection between an agent assigned to support the contact seeking support and the contact. Specifically, contacts awaiting support from the online service provider, associated with the contact storage 308, should already be connected to the online service provider through a service platform interface of the online service provider, such as the service platform interface 110 illustrated in FIG. 1.

In an embodiment, proficiencies can be linked to tags assignable to contacts seeking support and agents of an online service provider. For example, a proficiency range of 1-3 can be established. Other proficiency ranges can also be used. In this example, a proficiency value of 1, associated with a tag that identifies an attribute or skill, would indicate a low level of proficiency for that attribute or skill associated with the tag. In distinction, a proficiency value of 3, associated with the tag that identifies the attribute or skill, would indicate a high level of proficiency for that attribute or skill associated with the tag. Therefore, in an embodiment with proficiency levels enabled, the plurality of contacts 310 awaiting support can be represented by a Contact #[{T #, level #}, . . . {Tn, leveln}] format. Thus, the plurality of contacts 310, in one embodiment with levels of proficiency used, would be C1[{T1, 3}, {T2, 2}, {T3, 2}, {T4, 3}]-insertionTime: t0; C2[{T1, 2}, {T2, 2}]-insertion Time: t1; C3[{T1, 1}]-insertion Time: t2, and so forth. The proficiency levels can be used to define the agent and customer expertise level in the skill or attribute represented by one or more tags. The disclosed proficiency levels can be included in data of the nodes associated with the nodal data structure 302.

Figure 9:
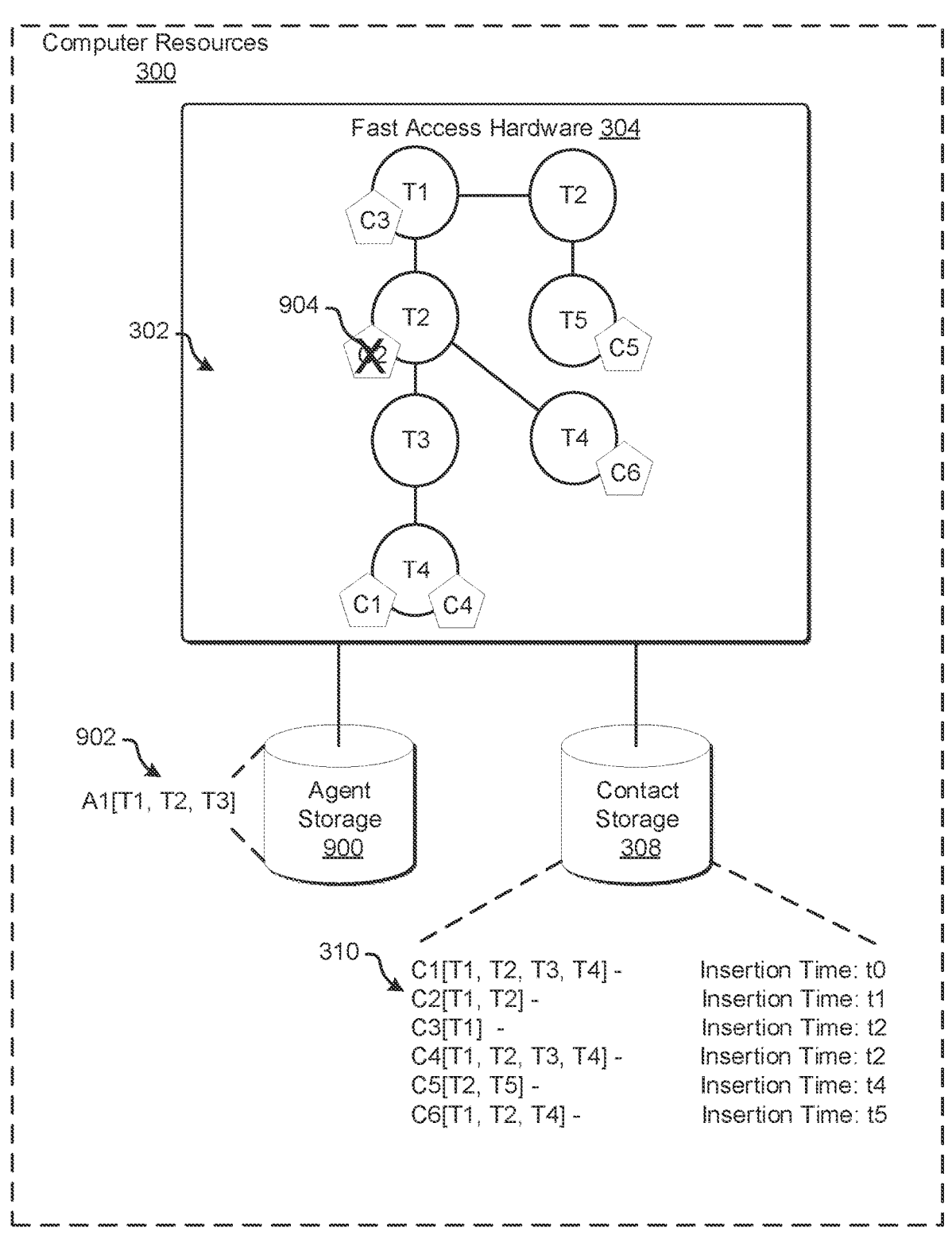
FIG. 9 illustrates techniques for matching an agent of an online service provider to a contact seeking support from the online service provider, in accordance with at least one embodiment.

FIG. 9 illustrates techniques for matching an agent of an online service provider to a contact seeking support from the online service provider, in accordance with an embodiment. In an embodiment, the fast access hardware 304 including the nodal data structure 302 is coupled to an agent storage 900. The agent storage 900 can comprise data corresponding to one or more agents 902 capable of addressing the needs of contacts seeking support from the online service provider. In an embodiment, the agent data corresponding to an agent can be represented by an agent number (e.g., A #) and tags and associated ordinal number (e.g., T #). The tag ordinal numbers allow for sorting the tags associated with the agent in ascending order. Contact information, such as email address, telephone number, and the like, associated with the agents can be included in the data in the agent storage 900. The agent data of the agent storage 900 can be used to traverse the nodal data structure 302 to identify a contact that will be matched with an agent.

The data corresponding to agent 902 shows that the corresponding agent is assigned tags T1-T3. The tags T1-T3 are sorted in ascending order based on tag ordinal number. The nodal data structure 302 is traversed using the tags T1-T3. The maximum set of lookups, using the nodal data structure 302, for the agent number A1 and the assigned tags T1-T3 is: 1. T1, T2, T3; 2. T1, T2; 3. T1, T3; 4. T2, T3; 5. T1; 6. T2; and 7. T3. Based on the lookups 1-7, the contacts represented by contact numbers C2 and C3 can be matched with the agent associated with agent number A1. The data associated with contact numbers C2 and C3 is analyzed to determine which of the two contacts associated with contact numbers C2 and C3 has been waiting longest in the contact storage 308. Based on the analysis, the contact associated with the contact number C2 is matched to the agent associated with the agent number A1. Specifically, based on insertion times, C2 was inserted into the contact storage 308 before C3 was inserted into the contact storage 308. After the agent and the contact are matched, the reference to the contact number C2 can be removed 908 from the nodal data structure 302. In an embodiment, the child node T2 can also be removed from the nodal data structure 302 if child nodes T3 and T4 were not connected to the child node T2.

In at least one embodiment, a nodal data structure that includes tags for agents and references to agent numbers can be used to match an agent of an online service provider to a contact seeking support from the online service provider. For example, the fast access hardware 304 can comprise the nodal data structure that includes tags for agents and references to agent numbers. The nodal data structure that includes tags for the agents and references to the agent numbers can be traversed based on an electronic document or profile of a contact that is awaiting support. The electronic document or profile of the contact can comprise tags linked to one or more attributes or skills assigned to the contact.

Figure 10:
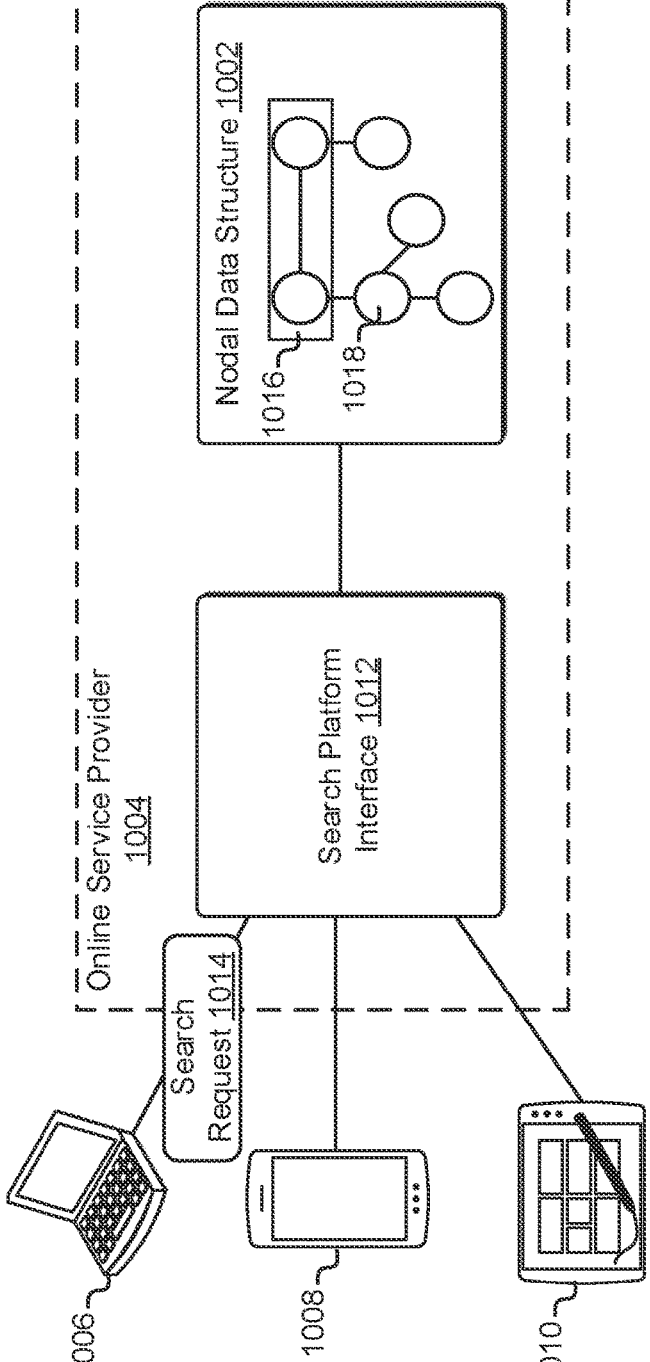
FIG. 10 illustrates a computing environment to provide a nodal data structure to support responding to search requests, in accordance with at least one embodiment.

FIG. 10 illustrates a computing environment 1000 to provide a nodal data structure 1002 to support responding to search requests, in accordance with at least one embodiment. In an example, the nodal data structure 1002 and the nodes of the data structure can be used as an index to search for one or more sources, such as electronic documents or webpages, that include keywords of a search query. The computing environment 1000 can include an online service provider 1004. The online service provider 1004 can provide storage and backup services, data processing services, key management services, virtual computing services, financial services, shopping services, and many other computing and data access services. Access to the online service provider 1004 is generally controlled by a variety of authentication and authorization techniques such as username/password pairs, digital certificates, network address filters, and biometric identification. When accessing the online service provider 1004, a customer or contact can provide the appropriate authentication information to the online service provider 1004, and the online service provider 1004 grants access. In some environments, customers of the online service provider 1004 obtain use of a variety of resources and services, such as computing nodes, servers, virtual machines, and other network-connected computing appliances.

As illustrated in FIG. 10, in an embodiment, users can connect to the online service provider 1004 using a variety of computing devices. For example, a laptop computer 1006, a smart phone 1008, or a tablet computer 1010 can be used to connect to the online service provider 1004. The computing devices can include an interface, such as a software-enabled interface, that allows users to interface with the online service provider 1004.

In an embodiment, at least one of the computing devices, such as the computing device 1006, interfaces with the online service provider 1004 to connect to a search platform interface 1012. The search platform interface 1012 can be associated with one or more servers of the online service provider 1004. A user searching for an electronic sources, such as electronic documents, webpages, or other sources, from the online service provider 1004 can communicate a search request 1014 to the service platform 110. In an embodiment, the user is human. In some embodiments, the user is a computer-implemented user, such as a user implemented by software, that is seeking search results from the online service provider 1004. Such a computer-implemented user can be instantiated by computer-implemented instructions executed by the computing device 1006. In an embodiment, the computer-implemented user is created based on artificial intelligence determining that search results are needed through analysis of one or more data sources, such as data of a software package on the computing device 1006, internet history accessible to the computing device 104, and the like.

The online service provider 1004 maintains the nodal data structure 1002. The nodal data structure 1002 can be maintained in a computer-implemented storage of the online service provider 1004. In an embodiment, the nodal data structure 1002 is an in-memory data structure. Specifically, the nodal data structure 1002 can be maintained in memory of the online service provider 1004 that facilitates rapid response time when accessing and modifying the nodal data structure 1002. In an embodiment, the nodal data structure 1002 is stored in fast access hardware, such as random access memory (RAM) that provides submillisecond latency. The nodal data structure 1002 can be persisted on discs, such as one or more SSDs, to guard against data loss in the event of a failure of the fast access hardware.

In an embodiment, the nodal data structure 1002 is used by the online service provider 1004 to identify electronic sources that include strings included in search requests, such as the search request 1014. The nodal data structure 1002 can include one or more root nodes 1016. Furthermore, the nodal data structure 1002 can include one or more child nodes 1018 connected to or from the one or more root nodes 1018. The nodes of the nodal data structure 1002 can comprise data. In an embodiment, the data associated with the nodes can be strings, such as unique words.

At least some of the nodes of the nodal data structure 1002 can include a reference to one or more electronic sources, such as documents, webpages, or other data. The search request 1014 can include data identifying at least one string, such as a word. In an embodiment, the search request 1014 includes data identifying a plurality of unique strings. The online service provider 1004 analyzes the nodal data structure 1002 to determine if a first string of the search request 1014 is identified in data of one or more root nodes 1016 of the nodal data structure 1002. When the first string is found in data of at least one root node 1016, data of a child node 1018 of the root node 1016 containing the data of the first string is analyzed to determine if a second string of the search request 1014 is found in the data of the child node 1018. The foregoing process is repeated for each string in the data associated search request 1014.

In addition, based on the described traversal of the nodal data structure 120, each node of the data structure 120 that includes data identifying a string from the search request 1014 is analyzed to determine if the node includes a reference to a source, such as an electronic document, webpage link, or the like. When a single reference identifying a source is identified from traversing the nodal data structure 120, the reference is associated with a search result that can be delivered to the computing device 1006. When a plurality of references associated with sources is identified from traversing the nodal data structure 120, references to the sources can be ranked based on their location in the nodal data structure 1002 and associated in ranked order in a search result that can be delivered to the computer device 1006.

Figure 11:
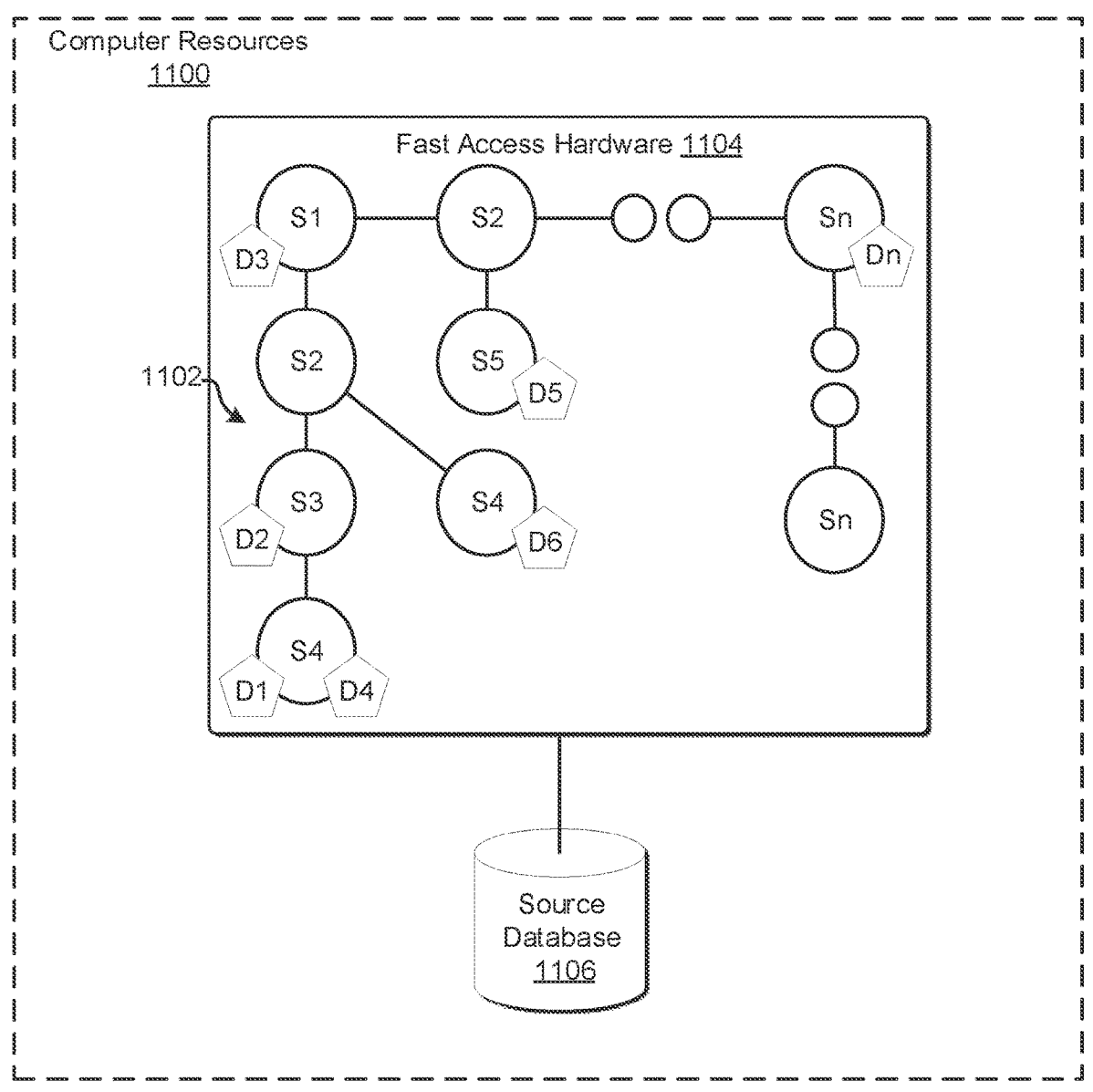
FIG. 11 illustrates computer resources that may include a nodal data structure, in accordance with at least one embodiment.

FIG. 11 illustrates computer resources 1100 that may include a nodal data structure 1102, in accordance with at least one embodiment. In an embodiment, the nodal data structure 1102 is stored in fast access hardware 1104. The fast access hardware 1104 can be embodied in RAM and associated with one or more dual in-line memory modules (DIMMs), or the like.

In an embodiment, the computer resources 1100 are associated with an online service provider, such as the online service provider 1004 illustrated in FIG. 10. Furthermore, in an embodiment, the nodal data structure 1102 can be generated by the online service provider based on analysis of data including strings, such as electronic sources including documents, webpages, and the like. Such data can be stored in a source database 1106. The data stored in the source database 1106 can include, as indicated, electronic sources that are identifiable using strings.

The nodal data structure 1102 can include one or more root nodes, such as root nodes identified by strings S1 and S2. In addition, the nodal data structure 1102 can include one or more child nodes, identified by strings S2, S3, S4, S5, and S4. The illustrated number of root nodes and child nodes of the nodal data structure 1102 is non-limiting, as the nodal data structure 1202 can be generated to include any number of root nodes and child nodes. In the foregoing, S equals a unique string, such as a word, and the number associated with S equals a unique ordinal number assigned to the unique string. The Sn format allows for sorting strings for placement in the nodal data structure 1102 in ascending order based on string ordinal numbers. In an embodiment, each node of the nodal data strong 1102 includes a reference to a unique string only, thus foregoing the use of ordinal numbers associated with unique strings.

The nodal data structure 1102 can also include references Dn to data stored in the source database 1106. In an embodiment, each of the references Dn refers to data, such as an electronic document or other source that includes strings identified by nodes of the nodal data structure 1102.

FIG. 12 illustrates a flow diagram 1200 including various processing acts, implemented by a system environment with one or more computing devices or nodes, which provide matching of agents to contacts using a nodal data structure, in accordance with at least one embodiment. In some implementations, the acts of the flow diagram 1200 are executed by one or more computing devices illustrated in FIGS. 1-11 and 18. The illustrated computing devices may execute computer-executable instructions incorporating at least some of the processing acts of the flow diagram 1200 to provide matching agents to contacts seeking support for one or more goods, products, and/or services.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 1202, a data structure for an agent is stored in a storage or queue. The agent associated with the data structure can help contacts or users seeking support for goods, products, and/or services. In an embodiment, the data structure for the agent is stored in a storage or queue maintained by an online service provider, such as the online service provider 102 illustrated in FIG. 1. For example, the data structure for the agent can be stored in the agent storage 118.

In an embodiment, the data structure identifies one or more tags assigned to the agent. These one or more tags can correspond to a predetermined skills, attributes, capabilities, and the like, available to be assigned to one or more agents. These one or more tags can also be assigned to one or more contacts seeking support for goods, products, and/or services. In an embodiment, the online service provider assigns the one or more tags to agents. The tags assigned to the one or more agents can be modified over time by the online service provider. In an embodiment, the data structure identifying the one or more tags is a profile for an agent.

At 1204, a nodal data structure is generated. In an embodiment, the nodal data structure is generated to support matching agents to contacts seeking support. Alternatively, in an embodiment, the nodal data structure is generated to support search requests for sources containing one or more strings or words associated with the search requests. In an embodiment, the nodal data structure is generated based on an already existing nodal data structure thereby augmenting the already existing nodal data structure. In some embodiments, the nodal data structure is a newly generated nodal data structure. In an embodiment, the nodal data structure corresponds to the nodal data structure 120 and/or the nodal data structure 1002.

The nodal data structure can comprise a root node and a child node of the root node. The root node can include a first tag associated with a plurality predetermined tags. The child node can include a second tag chosen from the plurality of predetermined tags. The first tag can include data corresponding to a first attribute and the second tag can include data corresponding to a second attribute. The attributes can be chosen from predetermined skills that can be linked to agents and contacts. In an embodiment, the attributes can be unique strings, such as unique words.

At 1206, a reference is stored. This reference can be stored and associated with the child node of the nodal data structure comprising the root node and the child node. In an embodiment, the reference can be used to identify a data structure for user, such as a user or contact seeking support for goods or services. In an implementation, the data structure for the user can be generated based on receiving a request for support from the user. In some embodiments, the data structure for the user includes the first tag and the second tag. In an embodiment, the reference can be used to locate a profile or electronic document for the user. The profile or the electronic document for the user can identify contact information associated with the user, details of the support that the user is seeking, skills assigned to the user, and the like. In an embodiment, the data structure for the user can be associated with the contact database 206 or other data structure associated with the computer resources 200 illustrated in FIG. 2.

At 1208, an agent is matched to a user. The agent can be associated with an online service provider. The user can be a contact seeking support from the online service provider for one or more goods or services. In an embodiment, matching the agent to the user can include retrieving or locating the data structure for the agent from the storage. The retrieved or located data structure can be analyzed to identify the first tag and the second tag. The first tag and the second tag can be sorted in ascending order based on individual ordinal numbers associated with the tags. In an embodiment, the first tag and the second tag are used to traverse the nodal data structure. Specifically, the first tag can be used to traverse the nodal data structure to identify a root node that includes data identifying the first tag. The second tag can be used to traverse the nodal data structure to identify a child node of the root node that includes data identifying the second tag. In an embodiment, a location of the reference to the data structure for the user is determined by traversing the nodal data structure. For example, the child node of the root node can include metadata identifying the location of the data structure for the user. In an embodiment, the metadata identifies a computer-implemented storage location of the data structure for the user. The data structure for the user can be analyzed to identify information pertaining to the user. The information pertaining to the user can be used to allow an agent to connect to the user, such as a chatroom location of the user, a telephony communication connection associated with the user, and email address, a telephone number, a physical location of the user, and so on.

At 1210, the agent matched to the user, based on the data structure for the agent, traversing the nodal data structure, and the data structure for the user, is connected to the user. This connection, in an embodiment, can be associated with the chat session between the agent and the user, a telephony session between the agent and the user, messaging, such as via email, between the agent and the user, and so forth.

FIG. 13 illustrates a flow diagram 1300 including various processing acts, implemented by a system environment with one or more computing devices or nodes, which provide matching of entities, such as agents to contacts, using a nodal data structure, in accordance with at least one embodiment. In some implementations, the acts of the flow diagram 1300 are executed by one or more computing devices illustrated in FIGS. 1-11 and 18. The illustrated computing devices may execute computer-executable instructions incorporating at least some of the processing acts of the flow diagram 1300 to provide matching agents to contacts seeking support for one or more goods, products, and/or services.

At 1302, a nodal data structure is stored or generated. In an embodiment, the nodal data structure is stored or generated to support matching agents to contacts seeking support. Alternatively, in an embodiment, the nodal data structure is stored or generated to support search requests for sources containing one or more strings or words associated with the search requests. In an embodiment, the nodal data structure is stored or generated based on an already existing nodal data structure thereby augmenting the already existing nodal data structure. In some embodiments, the nodal data stored or generated as a newly generated nodal data structure. In an embodiment, the nodal data structure corresponds to the nodal data structure 120 and/or the nodal data structure 1002.

The nodal data structure can comprise a first node and a second node of the first node. The first node can include a first tag associated with a plurality predetermined tags. The second node can include a second tag chosen from the plurality of predetermined tags. The first tag can include data corresponding to a first attribute and the second tag can include data corresponding to a second attribute. The attributes can be chosen from predetermined skills that can be linked to agents and contacts. In an embodiment, the attributes can be unique strings, such as unique words.

At 1304, a data structure for a first entity is associated with the second node of the nodal data structure. In an embodiment, a reference linked to the second node is used to associate the data structure for the first entity to the second node of the nodal data structure. In an embodiment, the reference can be used to identify the data structure for the first entity, such as a user or contact seeking support for goods or services. In an implementation, the data structure for the first entity can be generated based on receiving a request for support from the user. In some embodiments, the data structure for the first entity includes the first tag and the second tag. In an embodiment, the reference can be used to locate a profile or electronic document for the user. The profile or the electronic document for the user can identify contact information associated with the user, details of the support that the user is seeking, skills assigned to the user, and the like. In an embodiment, the data structure for the first entity can be associated with the contact database 206 or other data structure associated with the computer resources 200 illustrated in FIG. 2.

In an embodiment, the data structure for the first entity is generated based on a request associated with the first entity. The request associated with first entity can include information specifying a support need of the first entity. Furthermore, the request can include characteristics associated with first entity, such as identifying information for the first entity, access information for the first entity to allow the first entity to contact an online service provider, membership or status information for the first entity and associated with the online service provider, and the like. In an embodiment, the data structure for the entity is generated based on the request associated with the first entity.

At 1306, a data structure for a second entity can be used as a basis for traversing the data structure comprising the first node and the second node. In an embodiment, the data structure comprising the first node in the second node is traversed to locate the data structure for the first entity. In an embodiment, at least one of the first node and the second node comprises a reference to the data structure for the first entity. In an embodiment, the data structure for the second entity is linked to an agent designated to support entities seeking support for goods or services.

At 1308, the data structure for the first entity is referenced to identify the first entity. In an embodiment, the data structure for the first entity can include information identifying the first entity, such as name, email address, telephone number, one or more support needs of the first entity, and so forth. In an embodiment, the data structure for the first entity can be comprised in the contact storage 116, illustrated in FIG. 1, another computer-implemented storage of the online service provider 102, and/or one of the disclosed contact databases, and the like.

At 1310, at least based on identifying the first entity, a connection for the first entity is established. Such a connection can be a communications connection. In an embodiment, the connection for the first entity is a support communication session that allows the first entity to communicate with an agent designated to provide support to users of an online service provider. In an embodiment, the agent is the second entity, and the data structure for the second entity is associated with the agent. In an embodiment, the data structure for the second entity is a profile associated with the agent. In some embodiments, the data structure for the first entity is a profile associated with a contact seeking support from the online service provider.

FIG. 14 illustrates a flow diagram 1400 including various processing acts, implemented by a system environment with one or more computing devices or nodes, which provide matching of entities, such as agents and contacts, using a nodal data structure, in accordance with at least one embodiment. In some implementations, the acts of the flow diagram 1400 are executed by one or more computing devices illustrated in FIGS. 1-11 and 18. The illustrated computing devices may execute computer-executable instructions incorporating at least some of the processing acts of the flow diagram 1400 to provide matching agents to contacts seeking support for one or more goods, products, and/or services.

At 1402, a determination is made that an entity has connected to an online platform. In an embodiment, the entity is a contact seeking support. In some embodiments, the online platform is associated with an online service provider, such as the online service provider 102. The online platform can be associated with the service platform 110. FIG. 1 illustrates the online service provider 102 and the service platform interface 110.

At 1404, a data structure for the entity is identified. The data structure for the entity can comprise at least one predetermined attribute. The predetermined attribute can correspond to a predetermined skill or characteristic. In an embodiment, the predetermined attribute can be selected from a plurality of predetermined attributes. These predetermined attributes can be assigned to one or more entities, where the one or more entities can include contacts and agents.

At 1406, a data structure is generated. The data structure can be generated based on the data structure for the entity. In an embodiment, the data structure can comprise a node. The node can include the predetermined attribute. Specifically, data can be associated with the node that identifies the predetermined attribute. In an embodiment, the data structure is a nodal data structure comprising one or more root nodes and one or more child nodes of the root nodes. In an embodiment, each of the nodes of the data structure includes a tag that references a unique predetermined attribute selected from a plurality of predetermined attributes. In some embodiments, the data structure is the nodal data structure 120 or the nodal data structure 1002.

At 1408, the data structure for the entity is linked to the node of the data structure. In an embodiment, the data structure for the entity is linked to the node based on the predetermined attribute.

At 1410, an agent associated with the online platform is matched to the entity. In an embodiment, matching the agent to the entity includes at least referencing the data structure associated with the online platform and also referencing the data structure for entity. In an embodiment, the data structure associated with the online platform is a nodal data structure that is traversed to match the agent associated with the online platform. In some embodiments, the data structure associated with online platform is traversed based on consideration of a data structure linked to the agent, where the data structure linked to the agent includes at least the predetermined attribute associated with the node of the data structure for the online platform.

In an embodiment, subsequent to matching the agent to the entity at 1410, the data structure associated with the online platform can be modified to remove the node that references the predetermined attribute. Furthermore, in some embodiments, the data structure associated with the online platform can be persisted to computer storage. In an embodiment, the data structure associated with the online platform is stored in in-memory storage, such as RAM. The data structure associated with the online platform is persisted to computer storage to prevent data loss should the RAM fail.

FIG. 15 illustrates a flow diagram 1500 including various processing acts, implemented by a system environment with one or more computing devices or nodes, which provide responding to search requests using a nodal data structure, in accordance with at least one embodiment. In some implementations, the acts of the flow diagram 1500 are executed by one or more computing devices illustrated in FIGS. 1-11 and 18. The illustrated computing devices may execute computer-executable instructions incorporating at least some of the processing acts of the flow diagram 1500 to provide for responding to search request using a nodal data structure.

At 1502, a set of strings associated with strings included in data are identified or determined. In an embodiment, the data is comprised in one or more electronic documents, printed documents, webpages, transcripts, electronic sources, and the like. Furthermore, in an embodiment, the strings included in the data are words, where the set of strings includes a set of unique words. In an embodiment, the set of strings are identified or determined as part of processing the data so that the data is keyword searchable. In an embodiment, the data is stored in a database, such as the source database 1106 of the computer resources 1100, illustrated in FIG. 11.

At 1504, a data structure is generated. In an embodiment, the data structure is generated using the set of strings. The data structure can be generated to include a root node and a child node of the root node. In an embodiment, the root node comprises data identifying a first string in the set of strings. Furthermore, in an embodiment, the child node of the data structure can comprise data identifying a second string in the set of strings. Additionally, a reference to the data comprising the strings can be linked to the child node. In an embodiment, the reference to the data comprising the strings is comprised in metadata of the child node. As indicated at 1502, the data comprising the strings can be stored in the source database 1106 of the computer resources 1100.

At 1506, a search result is generated using the data structure comprising the root node and the child node. In an embodiment, the search result is generated based on traversing the nodes of the data structure. For example, in an embodiment, the search result can be generated based on traversing the data structure from the root node to the child node to locate the reference to the data comprising the strings. In an embodiment, the data structure comprising the root node in the child node is the nodal data structure 1102 stored in the fast access hardware 1104, illustrated in FIG. 11.

In an embodiment, the data structure comprising the root node in the child node can be augmented to include additional one or more root nodes and/or additional one or more child nodes. One or more of these additional nodes can include metadata referencing strings comprised in an additional set of strings included in additional data. Furthermore, in an embodiment, the search result generated at 1506 can be based on a search request. The search request can include the first string and the second string. Receiving or obtaining the search request can trigger the process of generating the search result at 1506. The search result generated at 1506 can be conveyed to a user. In an embodiment, the search result is conveyed to a computing device associated with the user that caused the generation of the search request.

FIG. 16 illustrates a flow diagram 1600 including various processing acts, implemented by a system environment with one or more computing devices or nodes, which provide responding to search requests using a nodal data structure, in accordance with at least one embodiment. In some implementations, the acts of the flow diagram 1600 are executed by one or more computing devices illustrated in FIGS. 1-11 and 18. The illustrated computing devices may execute computer-executable instructions incorporating at least some of the processing acts of the flow diagram 1600 to provide for responding to search request using a nodal data structure.

At 1604, a data structure is generated. In an embodiment, the data structure is generated based on first data and second data. The data structure can be generated to include a first node and a second node linked to the first node. In an embodiment, the first node comprises data identifying or including the first data. Furthermore, in an embodiment, the second node comprises data identifying or including the second data. Additionally, a reference to a data structure including the first data and the second data can be associated with the second node. In an embodiment, the reference to the data structure is comprised in metadata of the second node. In an embodiment, the data structure is a nodal data structure. For example, the nodal data structure is the nodal data structure 120 or the nodal data structure 1102. The data structure can be stored in a fast access hardware, such as the fast access hardware 1104 or any other fast access hardware disclosed herein.

At 1606, the reference to the data structure including the first data and the second data is located. In an embodiment, the reference to the data structure including the first data and the second data is located using the data structure generated based on the first data and the second data. In an embodiment, the reference to the data structure including the first data and the second data is located by traversing the first node and the second node of the data structure generated based on the first data and the second data.

FIG. 17 illustrates a flow diagram 1700 including various processing acts, implemented by a system environment with one or more computing devices or nodes, which provide responding to search requests using a nodal data structure, in accordance with at least one embodiment. In some implementations, the acts of the flow diagram 1700 are executed by one or more computing devices illustrated in FIGS. 1-11 and 18. The illustrated computing devices may execute computer-executable instructions incorporating at least some of the processing acts of the flow diagram 1700 to provide for responding to search request using a nodal data structure.

At 1702, a query is received. In an implementation, the query is a search request initiated by a user. The user can be human, or the user can be embodied in a machine. In an implementation, the user is a computer-implemented a user implemented by executing computer-executable instructions via a processor. In an embodiment, the query includes query data identifying a first data and a second data. The first data can comprise a string; and the second data can comprise another string. In an embodiment, the strings are unique words.

At 1704, a data structure is traversed. In an embodiment, the data structure is traversed in response to receiving the query comprising the query data. In an embodiment, the data structure includes a first node and a second node. The second node can be linked to the first node. In an embodiment, the first node comprises data identifying the first data. The second node can comprise data identifying the second data. In an embodiment, metadata comprises the first data and the second data. In an embodiment, the second node identifies a reference to a data structure including the first data and the second data. Metadata of the second node can identify the reference to the data structure including the first data in the second data.

At 1706, the reference to the data structure including the first data in the second data is located. In an embodiment, the data structure including the first data in the second data is located in order to respond to the query including the query data identifying the first data and the second data.

Figure 18:
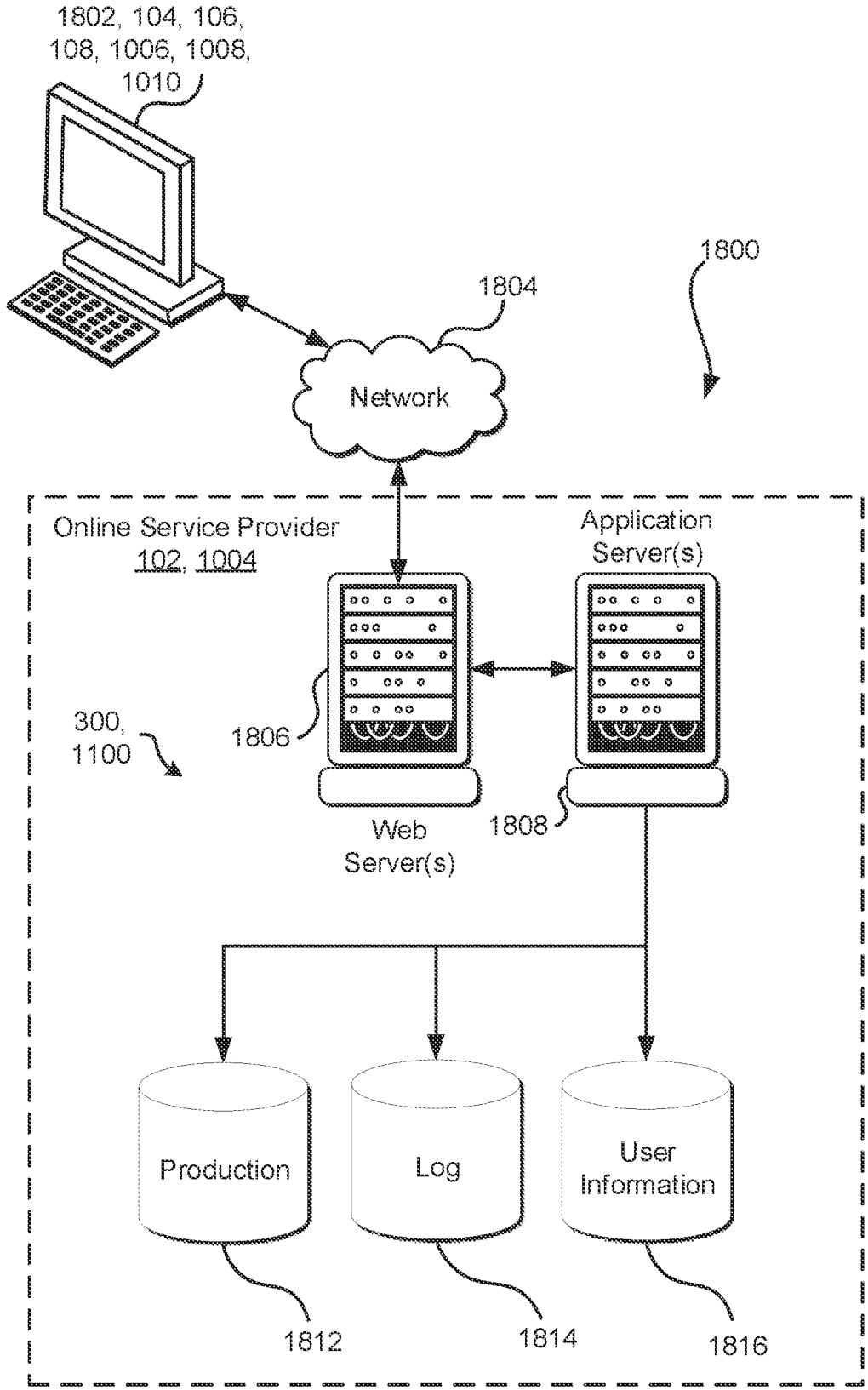
FIG. 18 illustrates a system in which various embodiments can be implemented.

FIG. 18 illustrates aspects of an example system 1800 for implementing aspects in accordance with an embodiment. As will be appreciated, although a web-based system is used for purposes of explanation, different systems may be used, as appropriate, to implement various embodiments. In an embodiment, the system includes an electronic client device 1802, which includes any appropriate device operable to send and/or receive requests, messages, or information over an appropriate network 1804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1806 for receiving requests and serving content in response thereto, although for other networks an alternative device serving a similar purpose could be used as would be apparent to one of ordinary skill in the art.

In an embodiment, the illustrative system includes at least one application server 1808 and a data store 1810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1802 and the application server 1808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1812 and user information 1816, which are used to serve content for the production side. The data store also is shown to include a mechanism for storing log data 1814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1810.

The data store 1810, in an embodiment, is operable, through logic associated therewith, to receive instructions from the application server 1808 and obtain, update or otherwise process data in response thereto, and the application server 1808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

At least one embodiment of the disclosure can be described in view of the following clauses:

Clause 1. A computer-implemented method, comprising: storing, in a storage, a first data structure for an agent, the first data structure for the agent comprising a plurality of tags, the agent to support users of an online service provider; generating a nodal data structure comprising a root node and a child node of the root node, the root node comprising a first tag from the plurality of tags and the child node comprising a second tag from the plurality of tags, the first tag corresponding to a first attribute of the agent and the second tag corresponding to a second attribute of the agent; storing a reference, the reference associating a second data structure for a user to the child node, the second data structure for the user comprising the first tag and the second tag; matching the agent to the user by at least: retrieving the first data structure for the agent from the storage; analyzing the first data structure for the agent to identify at least the first tag and the second tag; and determining a location of the reference to the second data structure for the user by traversing the nodal data structure according to the first tag and the second tag; and as a result of matching the agent to the user, establishing a connection between the agent and the user, the connection to allow the agent and the user to communicate.

Clause 2. The computer-implemented method according to clause 1, wherein the first attribute of the agent corresponds to a first skill of a plurality of skills assignable to the agent and the user and the second attribute of the agent corresponds to a second skill of the plurality of skills assignable to the agent and the user.

Clause 3. The computer-implemented method according to clause 1, further comprising: receiving a request for support, the request for support associated with the user and received by the online service provider; and in response to the request for support, generating the second data structure for the user, generating the second data structure for the user comprising analyzing the request for support and a profile of the user to select the first and second tags from the plurality of tags to include in the data structure.

Clause 4. The computer-implemented method according to clause 1, wherein generating the nodal data structure comprises: locating the second data structure for the user in a storage to store data structures for the users of the online service provider; analyzing the second data structure for the user to identify the first tag and the second tag comprised in the second data structure for the user; and using the first tag and the second tag identified in the second data structure for the user to generate the nodal data structure comprising the root node and the child node of the root node.

Clause 5. A non-transitory computer-readable storage medium storing thereon executable instructions that, as a result of being executed by one or more processors of a computer system, cause the computer system to: store a first data structure comprising a first node and a second node, the first node linked to the second node, the first node comprising data indicating a first attribute and the second node comprising data indicating a second attribute; associate a second data structure for a first entity with the second node, the second data structure for the first entity comprising the first attribute and the second attribute, the second data structure for the first entity associated with the second node based on at least one of the first attribute and the second attribute;

based on a third data structure for a second entity, traverse the first data structure comprising the first node and the second node to locate the second data structure for the first entity; reference the second data structure for the first entity to identify the first entity; and as a result of identifying the first entity, enable at least one connection for the first entity.

Clause 6. The non-transitory computer-readable storage medium of clause 5, wherein the instructions, as a result of being executed by the one or more processors, further cause the computer system to: receive a request associated with the first entity, the request including information specifying a support need and a plurality of characteristics associated with the first entity; and generate the second data structure for the first entity in response to the request, the second data structure generated to comprise the first attribute and the second attribute based on the plurality of characteristics associated with the first entity.

Clause 7. The non-transitory computer-readable storage medium of clause 5, wherein the second entity is a support agent of an online service provider, the support agent being a computer-implemented agent to support customers of an online service provider or a human agent to support the customers of the online service provider, and wherein the first entity is a customer of the online service provider.

Clause 8. The non-transitory computer-readable storage medium of clause 5, wherein the first attribute includes a first ordinal number comprised in data of the first attribute and the second attribute includes a second ordinal number comprised in data of the second attribute, the first ordinal number less than the second ordinal number in a set of attributes that include attributes ordered by ordinal numbers, the set of attributes comprising the first and second attributes, and wherein the instructions, as a result of being executed by the one or more processors, further cause the computer system to generate the data structure comprising the first node and the second node based at least on the first ordinal number comprised in the data of the first attribute and the second ordinal number comprised in the data of the second attribute.

Clause 9. The non-transitory computer-readable storage medium of clause 5, wherein the at least one connection for the first entity is a support session connection between the first entity and the second entity, the second entity is a support agent to support the first entity based on at least based on at least the first attribute or the second attribute comprised in the second data structure for the first entity.

Clause 10. The non-transitory computer-readable storage medium of clause 5, wherein the instructions, as a result of being executed by the one or more processors, further cause the computer system to: add a third node to the first data structure comprising the first node and the second node, the third node linked to the second node; traverse the first data structure comprising the first, second, and third nodes based on a fourth data structure for a third entity; and associate the fourth data structure for the third entity with the third node.

Clause 11. The non-transitory computer-readable storage medium of clause 5, wherein the first data structure, comprising the first node and the second, comprises a third node, the third node having a fourth data structure for a third entity associated therewith, the third node comprising data indicating a third attribute, the fourth data structure for the third entity comprising at least the third attribute, and the fourth data structure for the third entity associated with the third node based at least the third attribute being associated with the data indicating the third attribute and the fourth data structure for the third entity comprising at least the third attribute.

Clause 12. The non-transitory computer-readable storage medium of clause 5, wherein the instructions, as a result of being executed by the one or more processors, further cause the computer system to: at least as a result of enabling the at least one connection for the first entity, remove the second node from the first data structure comprising the first node and the second node; and store the data structure for the first entity in persistent storage.

Clause 13. A system, comprising: one or more processors; and memory that stores computer-executable instructions that are executable by the one or more processors to cause the system to: identify a first data structure for an entity that comprises a predetermined attribute selected from a plurality of predetermined attributes; generate a second data structure associated with an online platform based on the first data structure for the entity, the second data structure for the online platform comprising a node including the predetermined attribute; link the first data structure for the entity to the node based at least on the predetermined attribute; and match a resource associated with the online platform to the entity based on referencing the second data structure associated with the online platform and the first data structure for the entity linked to the node.

Clause 14. The system according to clause 13, wherein the stored computer-executable instructions that are executable by the one or more processors are to further cause the system to: determine the entity has connected to the online platform to request support from a client of the online platform, and wherein the plurality of predetermined attributes comprises skills established by the client based on a set of selectable skills offered by the online platform.

Clause 15. The system according to clause 13, wherein generating the second data structure associated with the online platform comprises analyzing the first data structure for the entity to identify the predetermined attribute, and based on identifying the predetermined attribute in the first data structure for the entity, generating the node including the predetermined attribute.

Clause 16. The system according to clause 13, wherein linking the first data structure for the entity to the node comprises analyzing the first data structure for the entity to identify the predetermined attribute, and traversing the second data structure associated with the online platform to identify the node including the predetermined attribute, and wherein linking the first data structure for the entity to the node further comprises storing a reference associating the first data structure for the entity to the node including the predetermined attribute.

Clause 17. The system according to clause 13, wherein the second data structure associated with the online platform comprises a plurality nodes, the node including the predetermined attribute coupled to a root node of the plurality nodes, the root node comprising an additional predetermined attribute from the plurality of predetermined attributes, and wherein the first data structure for the entity comprises the predetermined attribute and the additional predetermined attribute.

Clause 18. The system according to clause 13, wherein the stored computer-executable instructions that are executable by the one or more processors are to further cause the system to: subsequent to matching the resource to the entity, remove the node including the predetermined attribute from the second data structure associated with the online platform; and persist the first data structure for the entity to computer storage associated with the online platform.

Clause 19. The system according to clause 13, wherein matching the resource associated with the online platform to the entity further comprises identifying a third data structure of an agent and analyzing the third data structure of the agent to determine the third data structure of the agent comprises at least the predetermined attribute.

Clause 20. The system according to clause 13, wherein the predetermined attribute and the plurality of predetermined attributes are associated with unique skills assignable to the entity or the resource, at least one of the unique skills comprising a selectable proficiency value based on a plurality of proficiency values, the selectable proficiency value to indicate a relative proficiency, for the at least one of the unique skills, possessed by the entity or the resource.

At least one embodiment of the disclosure can be described in view of the following additional clauses:

Clause 1. A computer-implemented method, comprising: determining a set of strings from strings comprised in data, individual strings in the set of strings being different from one another, the strings in the set of strings ordered based on an ordinal number of each individual string in the set of strings; generating a data structure using the set of strings, the data structure including: a root node comprising a first string from the set of strings, the first string comprising an associated first ordinal number; a child node of the root node, the child node comprising a second string from the set of strings, the child node associated with the root node at least based on the second string being in the set of strings with the first string, wherein the second string comprises an associated second ordinal number greater than the first ordinal number; and a reference to the data comprising the strings, the reference linked to the child node; and generating a search result using on the data structure, the search result including a reference to the data comprising the strings, the search result generated as a result of traversing the data structure from the root node to the child node to locate the reference to the data comprising the strings.

Clause 2. The computer-implemented method according to clause 1, wherein the data is comprised in an electronic document, the individual strings in the set of strings are individual words in the data comprised in the electronic document, and wherein the first string of the root node and the second strong of the child node provide indexing data for locating the reference to the data comprising the string.

Clause 3. The computer-implemented method according to clause 1, further comprising adding an additional root node to the data structure and an additional child node of the additional root node, the additional root node comprising a third string and the additional child node comprising a fourth string, the third and fourth strings comprised in an additional set of strings from strings comprised in an additional data.

Clause 4. The computer-implemented method according to clause 1, further comprising: receiving a search request comprising at least the first string and the second string; ordering the first string and the second string based on the ordinal number associated with the first string and the ordinal number associated with the second string; as a result of receiving the search request, accessing the data structure to locate the root node based on the first string and the child node based on the second string, the root node and the child node of the root node providing a unique set of nodes of the data structure usable to locate the reference to the data comprising the strings; and causing the search result including the reference to the data comprising the first string and the second string to be conveyed to a user that initiated the search request.

Clause 5. A non-transitory computer-readable storage medium storing thereon executable instructions that, as a result of being executed by one or more processors of a computer system, cause the computer system to: generate a nodal data structure based on a first data and a second data, the first data and the second data having a determined ordering, the data structure comprising: a first node comprising the first data, the first node generated to comprise the first data based on the determined ordering; a second node comprising the second data, the second node generated to comprise the second data based on the determined ordering, the second node linked to the first node; and a reference to a data structure including the first data and the second data associated with the second node; and locate the reference to the data structure including the first data and the second data using the nodal data structure generated based on the first data and the second data.

Clause 6. The non-transitory computer-readable storage medium according to clause 5, wherein the reference to the data structure including the first data and the second data is associated in metadata of the second node.

Clause 7. The non-transitory computer-readable storage medium according to clause 5, wherein the instructions, as a result of being executed by the one or more processors, further cause the computer system to: add a third node to the nodal data structure, the third node comprising third data the third data associated with the first data and the second data having the determined ordering and added to the nodal data structure based on the determined ordering; and associate a reference to an additional data structure to the third node, the additional data structure comprising the first, second, and third data.

Clause 8. The non-transitory computer-readable storage medium according to clause 5, wherein the instructions, as a result of being executed by the one or more processors, further cause the computer system to: receive a search request comprising the first data and the second data; and in response to the search request, traverse the nodal data structure based on the first data and the second data comprised in the search request to locate the reference to the data structure including the first data and the second data.

Clause 9. The non-transitory computer-readable storage medium according to clause 8, wherein the data structure including the first data and the second data is an electronic document, and wherein the instructions, as a result of being executed by the one or more processors, further cause the computer system to generate a response to the search request, the response to the search request comprising a selectable link usable to access the electronic document including the first data and the second data.

Clause 10. The non-transitory computer-readable storage medium according to clause 5, wherein the first data includes a first string comprising a first word and the second data includes a second string comprising a second word.

Clause 11. The non-transitory computer-readable storage medium according to clause 5, wherein locating the reference to the data structure including the first data and the second data comprises identifying the first node of the nodal data structure using the first data, identifying the second node, after identifying the first node, using the second data, and accessing metadata of the second node to locate the reference to the data structure including the first data and the second data.

Clause 12. The non-transitory computer-readable storage medium according to clause 5, wherein the first node is a root node of the nodal data structure comprising the first and second nodes, and the second node is a child node of the first node, the nodal data structure comprising the first and second nodes generated to further comprise at least one additional root node linked to the root node and at least one additional child node from the at least one additional root node, the at least one additional child node comprising metadata including a reference to an additional data structure the comprises data associated with the additional root node and the additional child node.

Clause 13. A system, comprising: one or more processors; and memory that stores computer-executable instructions that are executable by the one or more processors to cause the system to: receive a query comprising query data identifying a first data and a second data; order the first data and the second data of the query data, the first data ordered to precede the second data; traverse, based at least on the ordering of the first data and the second data, a first data structure comprising: a first node comprising the first data; and a second node comprising the second data and a reference to a second data structure including the first data and the second data; and locate, using the reference to the second data structure including the first data and the second data, the second data structure to respond to the query comprising the query data identifying the first data and the second data.

Clause 14. The system according to clause 13, wherein the first data comprises a word and the second data comprises an additional word, the word being different from the additional word.

Clause 15. The system according to clause 13, wherein the reference to the second data structure including the first data and the second data is comprised in metadata of the second node.

Clause 16. The system according to clause 13, wherein the query is received by an online service provider, and the query is associated with a user seeking to identify one or more electronic sources that include at least the first data and the second data.

Clause 17. The system according to clause 13, wherein the first node is a root node of the first data structure comprising the first node and the second node and the second node is a child node of the root node, and wherein the reference to the second data structure including the first data and the second data is comprised in metadata of the child node.

Clause 18. The system according to clause 13, wherein the first node is a root node of the first data structure comprising the first and second nodes, and the second node is a child node of the first node, and wherein the stored computer-executable instructions that are executable by the one or more processors are to further cause the system to generate the first data structure to comprise at least one additional root node linked to the root node and at least one additional child node from the at least one additional root node, the at least one additional child node comprising metadata including a reference to an additional data structure the comprises data associated with the additional root node and the additional child node.

Clause 19. The system according to clause 13, wherein the stored computer-executable instructions that are executable by the one or more processors are to further cause the system to generate the first data structure comprising the first and second nodes to at least facilitate responding to one or more query requests to locate the second data structure including the first data and the second data.

Clause 20. The system according to clause 13, wherein the stored computer-executable instructions that are executable by the one or more processors are to further cause the system to: access the first data structure to locate the first node based on the first data and the second node based on the second data; and generating a query result including the reference the second data structure including the first data and the second data be conveyed to a user that initiated the query.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory that stores computer-executable instructions that are executable by the one or more processors to cause the system to:
receive a query comprising query data identifying a first data and a second data, the first data comprising a first string and the second data comprises a second string;
order the first data and the second data of the query data, the first data ordered to precede the second data based, at least in part, on an ordered set of strings comprising at least the first data ordered to precede the second data based on a unique ordinal number forming a portion of each string in the set of strings;
traverse, based at least on the ordering of the first data and the second data, a data structure stored in random access memory (RAM) comprising:
a first node comprising the first data, a first unique ordinal number, and a first reference to at least one electronic source including the first data; and
a second node, linked to the first node, comprising the second data, a second unique ordinal number, and a second reference to at least one electronic source including the first data and the second data; and
locate, using the first and second references, the at least one electronic source including the first data and the at least one electronic source including the first data and the second data to respond to the query comprising the query data identifying the first data and the second data.

2. The system according to claim 1, wherein the first string comprises a word and the second string comprises an additional word, the word being different from the additional word.

3. The system according to claim 1, wherein the reference to the at least one electronic source including the first data and the second data is comprised in metadata of the second node.

4. The system according to claim 1, wherein the query is received by an online service provider, and the query is associated with a user seeking to identify the at least one electronic source that include at least the first data and the second data.

5. The system according to claim 1, wherein the first node is a root node of the data structure comprising the first node and the second node and the second node is a child node of the root node, and wherein the reference to the at least one electronic source including the first data and the second data is comprised in metadata of the child node.

6. The system according to claim 1, wherein the first node is a root node of the data structure comprising the first and second nodes, and the second node is a child node of the first node, and
wherein the stored computer-executable instructions that are executable by the one or more processors are to further cause the system to generate the data structure to comprise at least one additional root node linked to the root node and at least one additional child node from the at least one additional root node, the at least one additional child node comprising metadata including a reference to an additional electronic source the comprises data associated with the additional root node and the additional child node.

7. The system according to claim 1, wherein the stored computer-executable instructions that are executable by the one or more processors are to further cause the system to generate the data structure comprising the first and second nodes to at least facilitate responding to one or more query requests to locate the at least one electronic source including the first data and the second data.

8. The system according to claim 1, wherein the stored computer-executable instructions that are executable by the one or more processors are to further cause the system to:
access the data structure to locate the first node based on the first data and the second node based on the second data; and
generate a query result including the reference the at least one electronic source including the first data and the second data be conveyed to a user that initiated the query.

9. A computer-implemented method, comprising:
receiving a query comprising query data identifying a first data and a second data:
ordering the first data and the second data of the query data, the first data ordered to precede the second data based, at least in part, on an ordered set of strings comprising at least one string combined with an ordinal number;
traversing, based at least on the ordering of the first data and the second data, a data structure stored in random access memory (RAM) comprising:
a first node comprising the first data, a first unique ordinal number, and a first reference to at least one electronic source including the first data; and a second node, linked to the first node, comprising the second data, a second unique ordinal number, and a second reference to at least one electronic source including the first data and the second data; and locating, using the first and second references, the at least one electronic source including the first data and the at least one electronic source including the first data and the second data to respond to the query comprising the query data identifying the first data and the second data.

10. The computer-implemented method according to claim 9, wherein the first data comprises a word and the second data comprises an additional word, the word being different from the additional word.

11. The computer-implemented method according to claim 9, wherein the reference to the at least one electronic source including the first data and the second data is comprised in metadata of the second node.

12. The computer-implemented method according to claim 9, wherein the query is received by an online service provider, and the query is associated with a user seeking to identify the at least one electronic source that include at least the first data and the second data.

13. The computer-implemented method according to claim 9, further comprising:

accessing the data structure to locate the first node based on the first data and the second node based on the second data; and generating a query result including the reference the at least one electronic source including the first data and the second data be conveyed to a user that initiated the query.

14. A non-transitory computer-readable storage medium storing thereon executable instructions that, as a result of being executed by one or more processors of a computer system, cause the computer system to:

receive a query comprising query data identifying a first data and a second data:

order the first data and the second data of the query data, the first data ordered to precede the second data based, at least in part, on an ordered set of strings comprising at least one string combined with a value;

traverse, based at least on the ordering of the first data and the second data, a data structure stored in random access memory (RAM) comprising:

a first node comprising the first data, a first unique ordinal number, and a first reference to at least one electronic source including the first data; and a second node, linked to the first node, comprising the second data, a second unique ordinal number, and a second reference to at least one electronic source including the first data and the second data; and locate, using the first and second references, the at least one electronic source including the first data and the at least one electronic source including the first data and the second data to respond to the query comprising the query data identifying the first data and the second data.

15. The non-transitory computer-readable storage medium according to claim 14, wherein the first data comprises a word and the second data comprises an additional word, the word being different from the additional word.

16. The non-transitory computer-readable storage medium according to claim 14, wherein the reference to the at least one electronic source including the first data and the second data is comprised in metadata of the second node.

17. The non-transitory computer-readable storage medium according to claim 14, wherein the query is received by an online service provider, and the query is associated with a user seeking to identify the at least one electronic source that include at least the first data and the second data.

18. The non-transitory computer-readable storage medium according to claim 14, wherein the executable instructions that, as a result of being executed by the one or more processors of the computer system, further cause the computer system to:

access the data structure to locate the first node based on the first data and the second node based on the second data; and generate a query result including the reference the at least one electronic source including the first data and the second data be conveyed to a user that initiated the query.

19. The non-transitory computer-readable storage medium according to claim 14, wherein the first node is a root node of the data structure comprising the first node and the second node and the second node is a child node of the root node, and wherein the reference to the at least one electronic source including the first data and the second data is comprised in metadata of the child node.

20. The non-transitory computer-readable storage medium according to claim 14, wherein the first node is a root node of the data structure comprising the first and second nodes, and the second node is a child node of the first node, and wherein the executable instructions that, as a result of being executed by the one or more processors of the computer system, further cause the computer system to generate the first data structure to comprise at least one additional root node linked to the root node and at least one additional child node from the at least one additional root node, the at least one additional child node comprising metadata including a reference to an additional electronic source the comprises data associated with the additional root node and the additional child node.

* * * * *